(12) United States Patent
Shiraishi

(10) Patent No.: US 10,192,282 B2
(45) Date of Patent: Jan. 29, 2019

(54) INFORMATION PROCESSING DEVICE, IMAGE PROCESSING APPARATUS, AND INFORMATION PROCESSING METHOD FOR HIGH-SPEED TRANSLUCENCY CALCULATION

(71) Applicant: Naoto Shiraishi, Kanagawa (JP)

(72) Inventor: Naoto Shiraishi, Kanagawa (JP)

(73) Assignee: Ricoh Company Ltd., Tokyo (JP)

( * ) Notice: Subject to any disclaimer, the term of this patent is extended or adjusted under 35 U.S.C. 154(b) by 0 days.

(21) Appl. No.: 15/426,486

(22) Filed: Feb. 7, 2017

(65) Prior Publication Data

US 2017/0256026 A1  Sep. 7, 2017

(30) Foreign Application Priority Data

Mar. 2, 2016 (JP) ................. 2016-040203

(51) Int. Cl.
| | |
|---|---|
| *G06T 1/20* | (2006.01) |
| *G06T 1/60* | (2006.01) |
| *G09G 5/36* | (2006.01) |
| *G09G 5/393* | (2006.01) |
| *G06F 3/06* | (2006.01) |

(52) U.S. Cl.
CPC .............. *G06T 1/60* (2013.01); *G06F 3/0611* (2013.01); *G06F 3/0659* (2013.01); *G06F 3/0683* (2013.01); *G06T 1/20* (2013.01); *G09G 5/363* (2013.01); *G09G 5/393* (2013.01)

(58) Field of Classification Search
None
See application file for complete search history.

(56) References Cited

U.S. PATENT DOCUMENTS

| | | | | |
|---|---|---|---|---|
| 6,081,274 | A | 6/2000 | Shiraishi | |
| 7,710,424 | B1* | 5/2010 | Hutchins | ................ G09G 5/363 345/537 |
| 8,786,631 | B1* | 7/2014 | Collins | .................... H04N 9/75 345/545 |
| 2003/0001857 | A1* | 1/2003 | Doyle | ..................... G06T 15/04 345/582 |
| 2003/0063813 | A1 | 4/2003 | Shiraishi | |
| 2004/0150656 | A1 | 8/2004 | Shiraishi | |
| 2005/0062994 | A1 | 3/2005 | Shiraishi | |
| 2005/0207667 | A1 | 9/2005 | Shiraishi | |

(Continued)

FOREIGN PATENT DOCUMENTS

| | | |
|---|---|---|
| JP | 7-028986 | 1/1995 |
| JP | 2010-220075 | 9/2010 |

(Continued)

*Primary Examiner* — Joni Richer
(74) *Attorney, Agent, or Firm* — Harness, Dickey & Pierce, P.L.C.

(57) ABSTRACT

An information processing device includes a first memory, a second memory, and a memory control circuit. The first memory stores first information. The second memory stores second information different from the first information. The memory control circuit controls reading and writing of the first information on the first memory and reading and writing of the second information on the second memory. The first information is read and written more frequently than the second information, and takes less time to be read than the second information.

15 Claims, 26 Drawing Sheets

(56) References Cited

U.S. PATENT DOCUMENTS

| | | | | |
|---|---|---|---|---|
| 2006/0044323 | A1* | 3/2006 | Ameline | G06T 11/001 |
| | | | | 345/595 |
| 2009/0128857 | A1 | 5/2009 | Shiraishi | |
| 2010/0238467 | A1 | 9/2010 | Shiraishi | |
| 2011/0033125 | A1 | 2/2011 | Shiraishi | |
| 2011/0063143 | A1 | 3/2011 | Shiraishi | |
| 2013/0094037 | A1 | 4/2013 | Shiraishi | |
| 2013/0155466 | A1 | 6/2013 | Shiraishi | |
| 2013/0229414 | A1* | 9/2013 | Gruber | G06T 15/40 |
| | | | | 345/426 |
| 2014/0085657 | A1* | 3/2014 | Segawa | G06F 3/1285 |
| | | | | 358/1.13 |
| 2014/0226186 | A1 | 8/2014 | Shiraishi | |
| 2014/0233067 | A1 | 8/2014 | Shiraishi | |
| 2014/0362395 | A1 | 12/2014 | Shiraishi | |
| 2015/0070369 | A1* | 3/2015 | Frascati | G09G 5/399 |
| | | | | 345/539 |
| 2015/0235113 | A1 | 8/2015 | Shiraishi | |
| 2015/0324287 | A1* | 11/2015 | Priel | G06F 12/0897 |
| | | | | 711/118 |

FOREIGN PATENT DOCUMENTS

| | | |
|---|---|---|
| JP | 2014-155164 | 8/2014 |
| JP | 2015-154363 | 8/2015 |

* cited by examiner

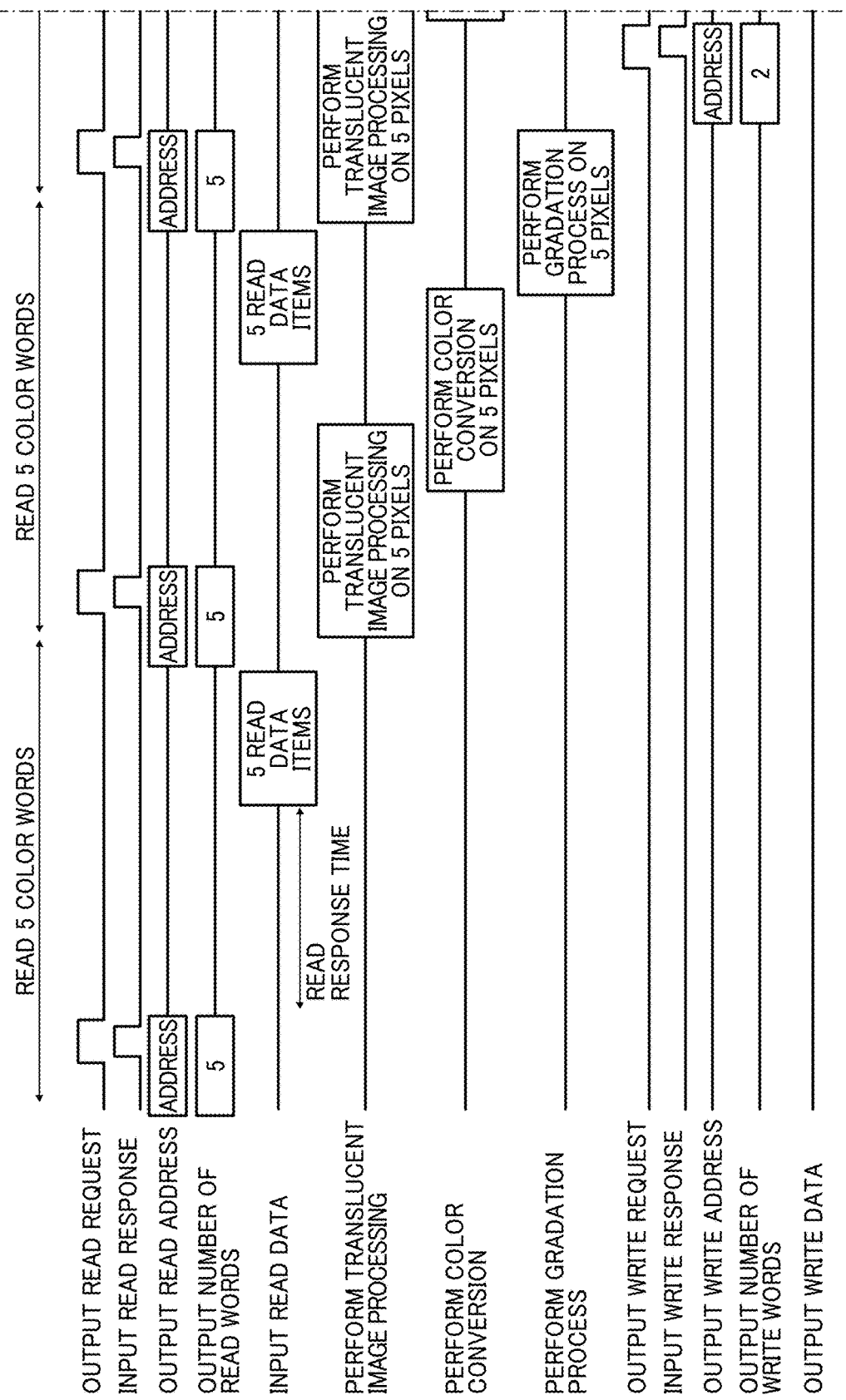

INFORMATION PROCESSING DEVICE, IMAGE PROCESSING APPARATUS, AND INFORMATION PROCESSING METHOD FOR HIGH-SPEED TRANSLUCENCY CALCULATION

CROSS-REFERENCE TO RELATED APPLICATION

This patent application is based on and claims priority pursuant to 35 U.S.C. § 119(a) to Japanese Patent Application No. 2016-040203 filed on Mar. 2, 2016, in the Japan Patent Office, the entire disclosure of which is hereby incorporated by reference herein.

BACKGROUND

Technical Field

The present invention relates to an information processing device, an image processing apparatus, and an information processing method.

Description of the Related Art

As a type of information processing device, a so-called page printer executes information processing based on a page description language (PDL). The page printer analyzes the PDL to generate rendering commands corresponding to an intermediate language, and executes information processing of generating print data based on the rendering commands. Specifically, the page printer renders multi-valued band images in a memory based on the rendering commands, performs a color conversion process, a gradation process, and an encoding process on the multi-valued band images, stores one page of encoded data of the multi-valued band images, and decodes and outputs the stored data.

In recent years, a function of handling translucent images has been added to some of PDLs, such as extensible markup language (XML) paper specification (XPS) and portable document format (PDF).

Further, PDF specifies "page group" processing in the specifications of PDF version 1.7. The page group processing of PDF is a type of image processing performed on pixel data of multi-valued band images. To handle translucent images in the page group processing, a translucency calculation process is repeatedly executed with the multi-valued band images stored in the memory and a parameter (i.e., a translucency value) for the translucency calculation process. The translucency calculation process is performed on each of pixels of the pixel data of the multi-valued band images. Therefore, data for translucent image processing (i.e., the translucency value) continues to be updated and held until the translucency calculation process is completed. During this translucency calculation process, a storage device (i.e., a main memory) is frequently accessed, and a large amount of data is transferred to and from the storage device.

To increase the speed of the rendering process and the translucent image processing described above, an image processing apparatus may use hardware to execute the rendering process and the translucent image processing to render a translucent image and a color image separately.

Further, to address information processing that increases the amount of data transferred to and from the storage device, a processor may be configured to reduce the amount of calculation processing related to image synthesis, such as a watermark synthesis process.

SUMMARY

In one embodiment of this invention, there is provided an improved information processing device that includes, for example, a first memory, a second memory, and a memory control circuit. The first memory stores first information. The second memory stores second information different from the first information. The memory control circuit controls reading and writing of the first information on the first memory and reading and writing of the second information on the second memory. The first information is read and written more frequently than the second information, and takes less time to be read than the second information.

In one embodiment of this invention, there is provided an improved image processing apparatus that includes the above-described information processing device.

In one embodiment of this invention, there is provided an improved information processing device that includes, for example, a first storage unit, a second storage unit, and a storage controller. The first storage unit stores first information. The second storage unit stores second information different from the first information. The storage controller controls reading and writing of the first information on the first storage unit and reading and writing of the second information on the second storage unit. The first information is read and written more frequently than the second information, and takes less time to be read than the second information.

In one embodiment of this invention, there is provided an improved image processing apparatus that includes the above-described information processing device.

In one embodiment of this invention, there is provided an improved information processing method that includes, for example, storing first information in a first memory, and storing second information in a second memory. The first information is read and written more frequently than the second information, and takes less time to be read than the second information.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 33A and 33B are a timing chart illustrating an example of page group processing according to the second embodiment.

Figure 1:
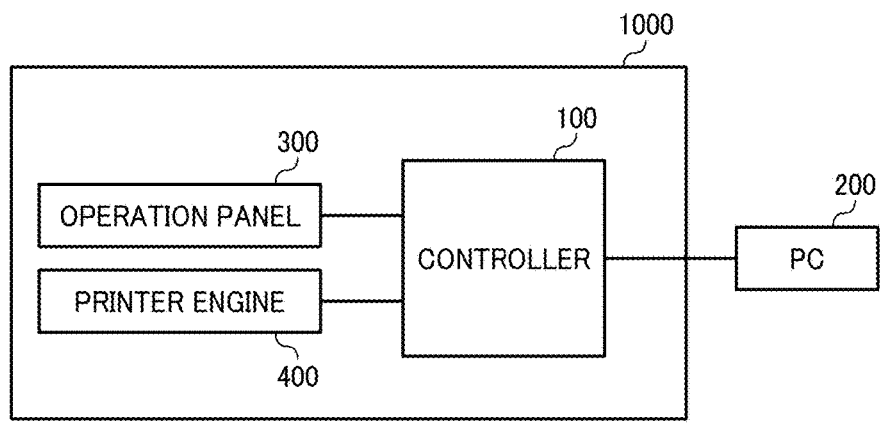
FIG. 1 is a block diagram schematically illustrating a configuration example of an information processing device and an image processing apparatus according to a first embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Advances in semiconductor technologies in recent years have allowed hardware to perform a part of the calculation process used to be performed by a central processing unit (CPU) of an information processing device, such as a translucency calculation process in page group processing of images including translucent images. In information processing such as the page group processing of images including translucent images, however, the frequency of access to a storage device (i.e., a memory) is increased. Therefore, the use of hardware to perform a part of the information processing is insufficient for increasing the overall information processing speed, and existing memory access methods and memory access control methods remain open to further improvement.

Referring now to the accompanying drawings, wherein like reference numerals designate identical or corresponding parts throughout the several views, embodiments of the present invention will be described.

An information processing device according to a first embodiment of the present invention will be described.

As illustrated in FIG. 1, a controller 100 as the information processing device according to the first embodiment may be employed in a printer 1000, which is an image forming apparatus as an example of an image processing apparatus according to the first embodiment.

As well as the controller 100, the printer 1000 includes an operation panel 300 and a printer engine 400, as illustrated in FIG. 1. The operation panel 300 and the printer engine 400 are connected to a personal computer (PC) 200 via the controller 100. The printer 1000 drives the printer engine 400 via the controller 100 based on data output by the PC 200 to thereby print out figures and text, for example, on a recording medium such as paper.

The printer engine 400, which includes driving units for forming an image, prints out an image in accordance with a predetermined output format. The operation panel 300 is an input and output device including units such as a display unit to display information of the printer 1000 and an input unit to receive inputs of operation settings and operation instructions. The controller 100 is a controlling device that includes an arithmetic unit to control the entirety of the printer 1000 (i.e., the image processing apparatus).

A description will be given of translucent image processing, which is a type of specific information processing executed by the controller 100 (i.e., the information processing device) of the present embodiment.

In the translucent image processing, images to be rendered are superimposed upon each other, with each of the images in a translucent state. For example, when two images are superimposed upon each other, with each of the images in a translucent state, the two images are processed such that the sum of respective translucency values of the two superimposed images becomes 1. That is, after a superimposition process is performed on translucent images, the sum of respective translucency values of the translucent images is 1 in an area in which the translucent images are superimposed upon each other. The translucency value may also be referred to as translucency data.

The translucent image processing is performed on red-green-blue (RGB) 24-bit, multi-valued pixel data based on intermediate data obtained from analysis of a page description language (PDL).

A description will now be given of the translucent image processing executed in "page group" processing specified in version 1.7 of portable document format (PDF) as a PDL.

The page group processing is another type of specific information processing executed by the controller 100 (i.e., the information processing device) of the present embodiment. In the page group processing, the translucent image processing is performed on all multi-valued pixel data rendered in page units, to thereby render image data. Thereafter, translucency calculation is performed with the rendered multi-valued pixel data, the translucency value, and later-described fixed values. The page group processing generates image data based on an assumed color of paper as the recording medium (i.e., multi-valued pixel picture data).

Figure 2:
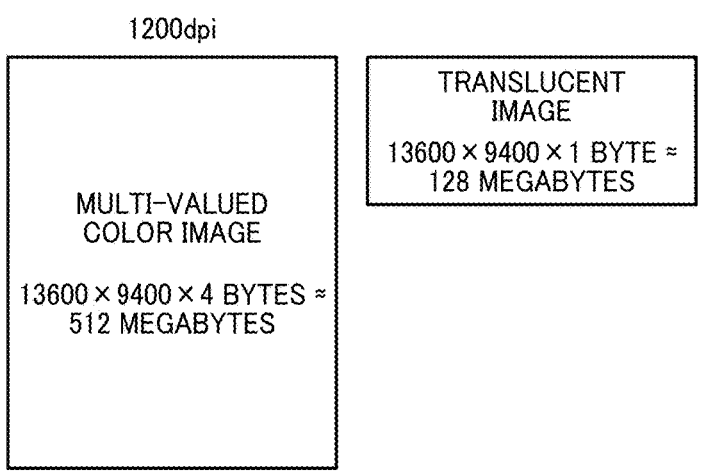
FIGS. 2 and 3 are diagrams each illustrating an example of an image data amount used in the image processing apparatus according to the first embodiment.
Figure 3:
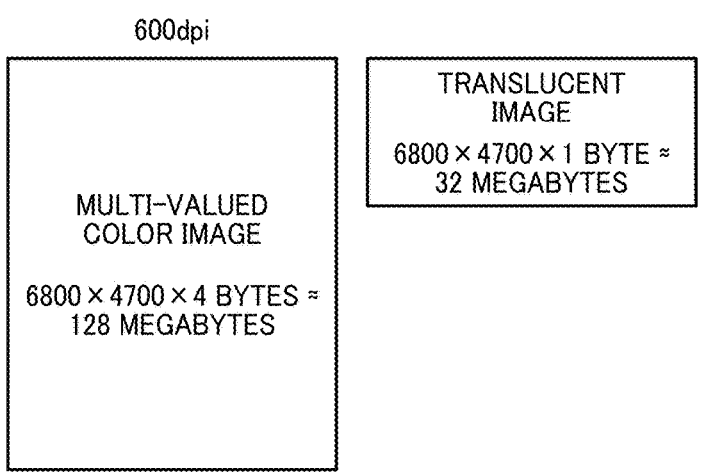

The translucency values used in the above-described translucent image processing correspond to the pixel data. Therefore, in the case of 1200 dpi image data illustrated in FIG. 2, for example, the data size of the translucency values is 128 megabytes (MB). Further, in the case of 600 dpi image data illustrated in FIG. 3, the data size of the translucency values is 32 MB.

As described above, the data size of the translucency values increases with an increase in resolution of the output image. Until the completion of the page group processing, the translucency values are necessary to be retained, and thus continue to be updated. After the page group processing, i.e., when the RGB 24-bit, multi-valued pixel data is created and the printer 1000 proceeds to an output process (i.e., printing process), however, the translucency values are no longer necessary.

Figure 4A:
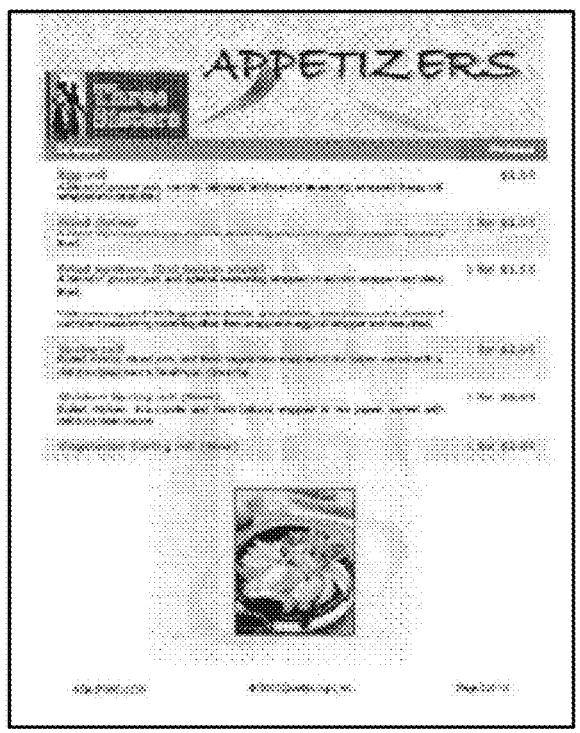
FIGS. 4A and 4B are diagrams each illustrating an example of a translucent image used in the image processing apparatus according to the first embodiment.
Figure 4B:
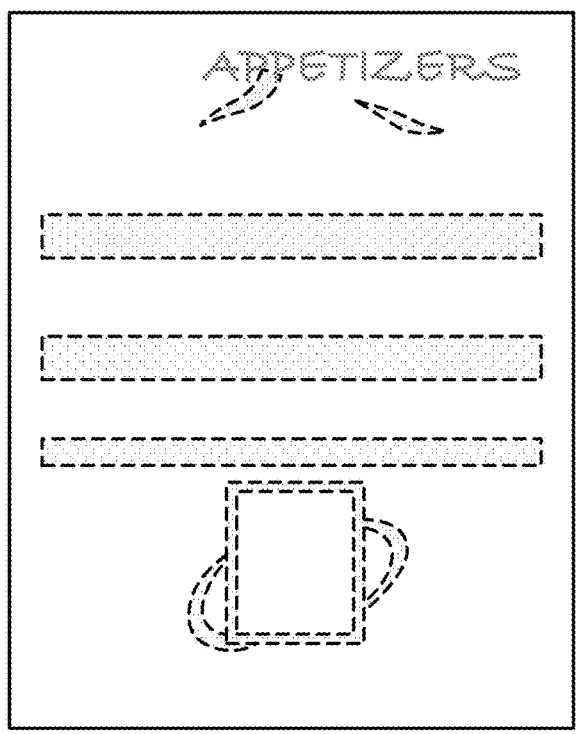

FIGS. 4A and 4B illustrate an example of a translucent image. Specifically, FIG. 4A illustrates an example of an output image subjected to the translucent image processing and the page group processing, and FIG. 4B illustrates an example of a translucent image included in the output image of FIG. 4A. As illustrated in FIG. 4B, the translucent image covers not all but a part of the output image. The translucency values are associated with coordinates of the area in the output image corresponding to the translucent image, and thus may be absent in some parts of the output image. In the page group processing, however, each of pixels of the pixel data forming a page is checked for the presence or absence of the corresponding translucency value.

As described above, in the page group processing involving the translucent image processing, reading and writing (i.e., updating) of the translucency value are frequently performed even if the translucency value may not be included in some parts of final output data. In other words, the page group processing involving the translucent image processing is an example of processing involving frequent memory access.

Figure 5:
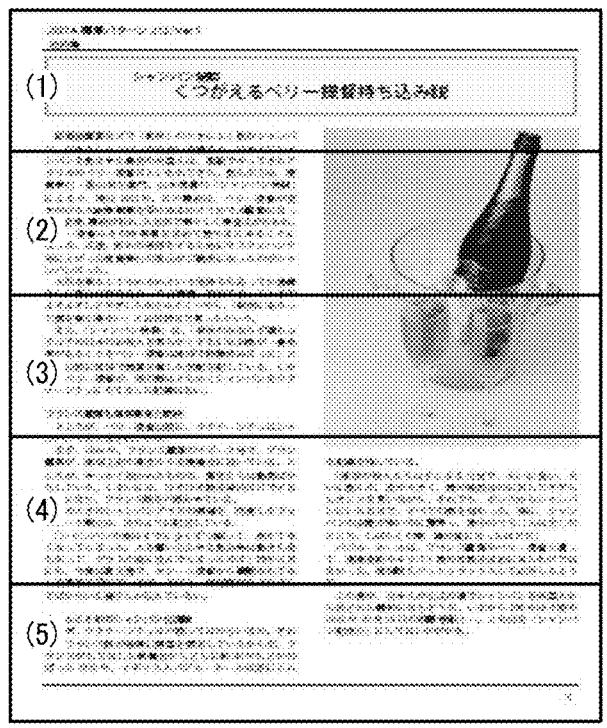
FIGS. 5 and 6 are diagrams each illustrating an example of processing units of image data used in the image processing apparatus according to the first embodiment.
Figure 6:

For example, the page group processing involving the translucent image processing may be performed on band images of a page divided into band units, as illustrated in FIG. 5, or may be performed on rectangular images of a page divided into rectangular units, as illustrated in FIG. 6. If the data to be processed is divided into the band units or the rectangular units, such as band units (1) to (5) in FIG. 5 or rectangular units (11) to (30) in FIG. 6, units of processing are reduced in size. It is assumed in the present embodiment and subsequent embodiments that predetermined image processing is performed on divided areas of each page divided into the band units or the rectangular units.

Figure 7:
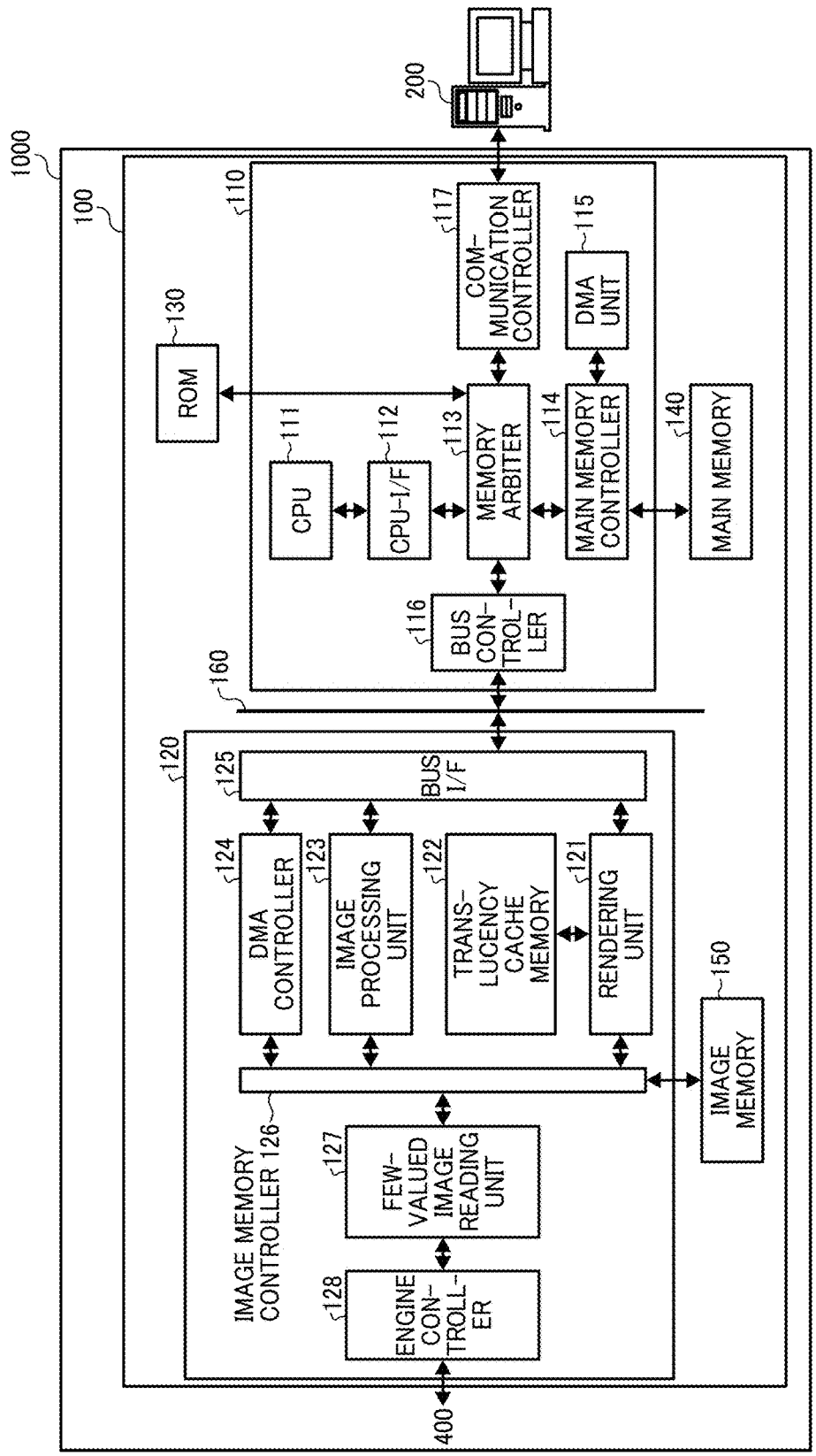
FIG. 7 is a block diagram schematically illustrating a configuration example of the information processing device according to the first embodiment.

FIG. 7 is a diagram illustrating a configuration example of the controller 100 (i.e., the information processing device) according to the present embodiment. The controller 100 as the information processing device functions here as an image processing device that processes image information.

As illustrated in FIG. 7, the controller 100 includes a main controller 110 that controls the operation of the entire controller 100, an application specific integrated circuit (ASIC) 120 for image processing, a read-only memory (ROM) 130, a main memory 140, and an image memory 150. The main controller 110 and the ASIC 120 are connected to each other via a bus 160.

The main controller 110 includes a central processing unit (CPU) 111, a CPU-interface (I/F) 112, a memory arbiter 113, a main memory controller 114, a direct memory access (DMA) unit 115, a bus controller 116, and a communication controller 117.

The CPU 111 performs overall control of the controller 100 and control of the main controller 110. The CPU 111 further analyzes a PDL transmitted from the PC 200 to generate rendering commands serving as an intermediate language. The rendering commands include commands for rendering a multi-valued image, for example, and rendering parameters used for the rendering. The rendering commands are temporarily stored in the main memory 140, and thereafter are transferred to the image memory 150 via a bus I/F 125 and a DMA controller 124 of the ASIC 120 to be stored in the image memory 150. Each of the rendering commands transferred to the image memory 150 is stored in a predetermined storage area in the image memory 150, and is used in a rendering process performed by a rendering unit 121 of the ASIC 120 and in image processing performed by an image processing unit 123 of the ASIC 120.

The CPU-I/F 112 serves as an interface of the CPU 1111, and is connected to the main memory controller 114, the bus controller 116, and the communication controller 117 via the memory arbiter 113.

The memory arbiter 113 arbitrates accesses to the main memory 140 by the main memory controller 114, the bus controller 116, and the communication controller 117 of the main controller 110.

The main memory controller 114 controls the access to the main memory 140 in accordance with a command from the CPU 111, for example. The main memory controller 114 is connected to the bus controller 116 and the communication controller 117 of the main controller 110 via the memory arbiter 113.

The DMA unit 115 is a device for transferring data between the main memory 140 and other devices without routing through the CPU 111. The DMA unit 115 is connected to the main memory 140 via the memory arbiter 113 and the main memory controller 114.

The bus controller 116 controls accesses to the bus 160 by the main memory controller 114 and the communication controller 117, which input and output data to and from the bus 160.

The communication controller 117 receives data such as the PDL transmitted from the PC 200, which is connected to the communication controller 117 via a network. The communication controller 117 further outputs the received data to the main memory controller 114 and the bus controller 116 connected to the communication controller 117 via the memory arbiter 113, and transmits data input by the main memory controller 114 and the bus controller 116 to the PC 200.

The ROM 130 stores a computer program executed by the CPU 111 and font information of characters, for example.

The main memory 140 includes, for example, a storage area for storing the rendering commands, a storage area for storing PDF data (i.e., data of the PDF as a PDL), and a storage area for storing parameters for the image processing. As well as the variety of data, programs executed by the CPU 111 may also be stored in the above-described storage areas of the main memory 140.

Figure 8:
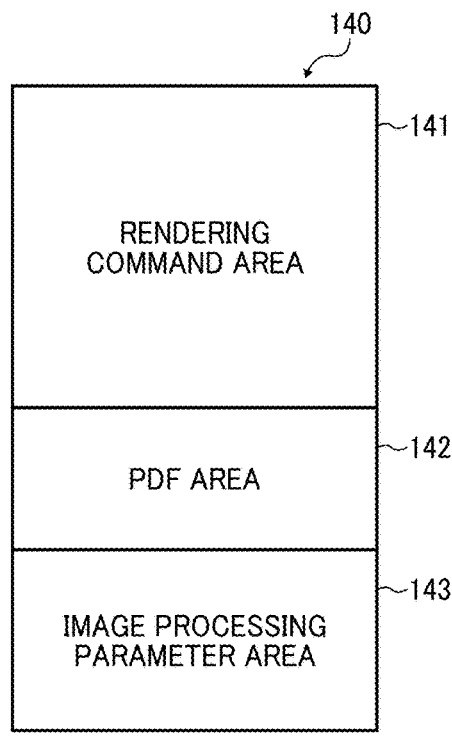
FIG. 8 is a diagram illustrating a configuration example of storage areas in a main memory of the information processing device according to the first embodiment.

FIG. 8 is a diagram illustrating a configuration example of the storage areas of the main memory 140. As illustrated in FIG. 8, the main memory 140 includes a plurality of predetermined areas, such as a rendering command area 141 for storing the rendering commands, a PDF area 142 for storing the PDF data, and an image processing parameter area 143 for storing the parameters for the image processing.

Referring back to FIG. 7, a configuration of the ASIC 120 of the present embodiment will be described.

The ASIC 120 includes the rendering unit 121, a translucency cache memory 122, the image processing unit 123, the DMA controller 124, the bus IF 125, an image memory controller 126, a few-valued image reading unit 127, and an engine controller 128. The ASIC 120 is hardware that performs a part of image processing normally performed by the CPU 111 in a typical information processing device, such as the translucent image processing and the page group processing. That is, the ASIC 120 is hardware that performs processing functions of an image processing program normally performed by the CPU 111 in a typical information processing device, such as a rendering function and an image processing function.

Via the bus 160, the ASIC 120 reads the rendering commands stored in the rendering command area 141 of the main memory 140. The ASIC 120 then transfers the read rendering commands to the image memory 150, analyzes the rendering commands, and executes a rendering process of rendering an image in the image memory 150. After the rendering process, the ASIC 120 execute image processing on the image, and outputs the processed image to the printer engine 400.

The image memory 150 connected to the ASIC 120 will now be described.

The image memory 150 is a type of storage circuit, and is a double data rate (DDR) memory connected to the ASIC 120 via the image memory controller 126 serving as a memory bus. In a process using the image memory 150, therefore, read latency is taken into account as a characteristic of the DDR memory. The read latency refers to a delay occurring in a process of data reading from a memory circuit, specifically a delay after a read command is enabled until actual data reading starts.

Figure 9:
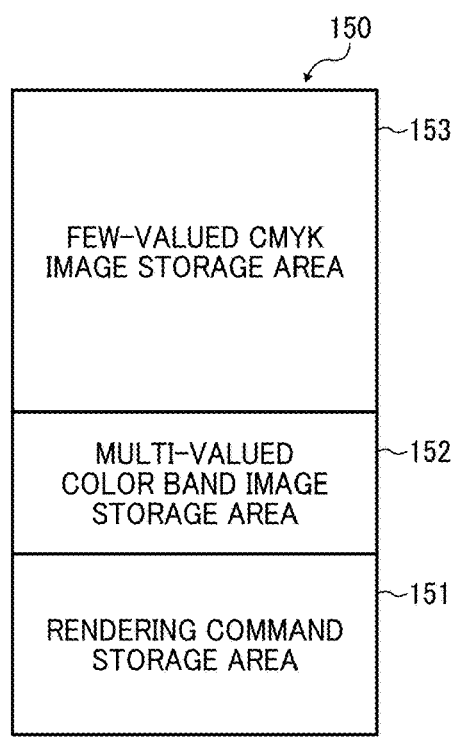
FIG. 9 is a diagram illustrating a configuration example of storage areas in an image memory of the information processing device according to the first embodiment.

FIG. 9 is a diagram illustrating a configuration example of storage areas of the image memory 150. As illustrated in FIG. 9, the image memory 150 of the present embodiment includes a rendering command storage area 151, a multi-valued color band image storage area 152, and a few-valued cyan-magenta-yellow-black (CMYK) image storage area 153.

The rendering command storage area 151 stores the rendering commands transferred from the rendering command area 141 of the main memory 140. In the multi-valued color band image storage area 152, the rendering unit 121 renders a color band image, which is a multi-valued image. The few-valued CMYK image storage area 153 stores a few-valued CMYK image, which is a few-valued image generated through the image processing by the image processing unit 123.

In the present embodiment, an expression "render an image in a storage area" refers to a process of saving (i.e., storing) image data (i.e., pixel data) at a predetermined address in the storage area or a process of overwriting image data already stored in the storage area with different image data.

In the present embodiment, a multi-valued image refers to an image that is rendered by a rendering method of directly rendering an image in pixel units of red (R), green (G), blue (B), and attribute (A) or cyan (C), magenta (M), yellow (Y), and black (K) and is not yet subjected to the gradation process. Each of RGBA is allocated with eight bits, and thus RGBA as a whole are allocated with 24 bits. Further, each of CMYK is allocated with eight bits, and thus CMYK as a whole are allocated with 32 bits.

On the other hand, a few-valued image refers to an image obtained by color-converting the RGB multi-valued image into a CMYK multi-valued image, performing the gradation process on the CMYK multi-valued image, and converting a C plane image, an M plane image, a Y plane image, and a K plane image of the CMYK multi-valued image into images of a smaller bit number, such as 1 bit or 2 bits. In this case, each of the RGB color components is allocated with eight bits, and thus the RGB color components as a whole are allocated with 24 bits. Further, each of the CMYK color components is allocated with eight bits, and thus the CMYK color components as a whole are allocated with 32 bits. The few-valued image is printed by a printer on the recording medium such as paper for each of a C plane, an M plane, a Y plane, and a K plane, and thus is a plane image.

The multi-valued color band image storage area 152 of the image memory 150 stores ARGB_PIXEL band data, which is rendered based on the result of analysis of the PDL data such as the PDF data and holds the attribute (A) and respective color values of the RGB color components.

Figure 10:
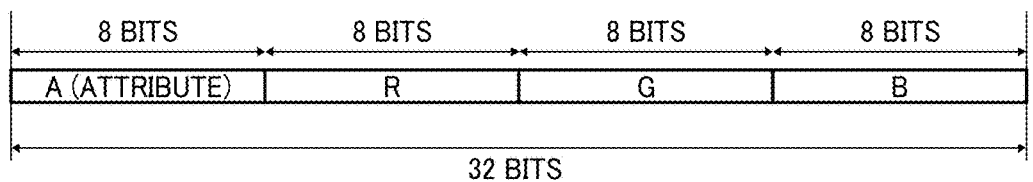
FIG. 10 is a diagram illustrating an example of a data format stored in a multi-valued color band image storage area of the image memory according to the first embodiment.

FIG. 10 is a diagram illustrating an example of a data format stored in the multi-valued color band image storage area 152 of the image memory 150 in the present embodiment. As illustrated in FIG. 10, the data format includes the attribute (A) and the RGB color components. Each of the attribute (A) and the pixels of the RGB color components is allocated with eight bits. That is, the ARGB_PIXEL band data is 32-bit, multi-valued pixel image data (i.e., a multi-valued image) in which each of the attribute (A) and the pixels of the RGB color components has a bit depth of eight bits. The value of the attribute (A) corresponds to a pixel attribute plane that is created to hold an attribute value of the pixels, which represents a value related to an object to be rendered as an attribute of the pixels.

Figure 11:
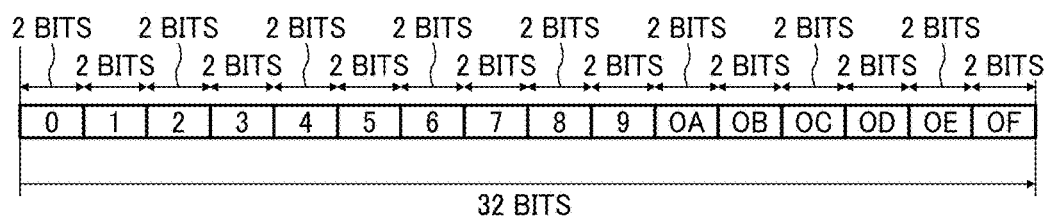
FIG. 11 is a diagram illustrating an example of a data format stored in a few-valued CMYK image storage area of the image memory according to the first embodiment.

The few-valued CMYK image storage area 153 of the image memory 150 stores respective few-valued band images of the C plane, the M plane, the Y plane, and the K plane. FIG. 11 is a diagram illustrating an example of a data format stored in the few-valued CMYK image storage area 153 of the present embodiment. As illustrated in FIG. 11, in this data format, two bits are allocated to each of the pixels of the C plane, the M plane, the Y plane, and the K plane. That is, the few-valued CMYK image corresponding to few-valued band image data is a few-valued image corresponding to 32-bit, few-valued plane image data, in which each of the pixels of the planes has a bit depth of two bits.

Referring back to FIG. 7, the rendering unit 121 serves as an information updating unit that reads the rendering commands stored in the rendering command storage area 151 of the image memory 150, and executes the rendering process on the multi-valued color band image storage area 152 of the image memory 150. The processing performed by the rendering unit 121 is specific information processing involving translucency calculation using the multi-valued image stored in the image memory 150 and the translucency value stored in the translucency cache memory 122. With the result of the translucency calculation executed by the rendering unit 121, a multi-valued image subjected to the translucent image processing is rendered in the multi-valued color band image storage area 152 of the image memory 150. The translucency value used in the translucency calculation is updated and stored in the translucency cache memory 122.

The translucency cache memory 122 stores the translucency value rendered in the translucent image processing executed by the rendering unit 121. The translucency cache memory 122 is a storage area forming a part of a cache memory included in the ASIC 120. The translucency cache memory 122 is not a DDR memory unlike the image memory 150, and thus no read latency occurs when the rendering unit 121 accesses the translucency cache memory 122. When the rendering unit 121 accesses the image memory 150, which is a DDR memory, on the other hand, the read latency is taken into account.

As described above, the rendering unit 121 serves as a type of memory control unit, and accesses and controls the translucency cache memory 122 and the image memory 150, which serve as a first memory and a second memory, respectively. The connection of the translucency cache memory 122 (i.e., the first memory) to the rendering unit 121 is different from the connection of the image memory 150 (i.e., the second memory) to the rendering unit 121.

Herein, a plurality of information items stored in the translucency cache memory 122 and a plurality of information items stored in the image memory 150 are referred to as first information and second information, respectively. A first time taken for the rendering unit 121 to read the first information from the translucency cache memory 122 is shorter than a second time taken for the rendering unit 121 to read the second information from the image memory 150. Further, a first information amount of the first information written to and read from the translucency cache memory 122 by the rendering unit 121 is less than a second information amount of the second information written to and read from the image memory 150 by the rendering unit 121. Further, the first information is read and written more frequently than the second information.

With this configuration, read access to (i.e., data reading from) the translucency cache memory 122 by the rendering unit 121 is faster than read access to the image memory 150 by the rendering unit 121 via the image memory controller 126 (i.e., the memory bus).

Figure 12:
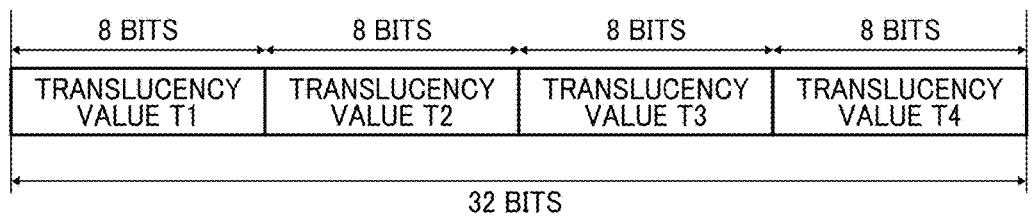
FIG. 12 is a diagram illustrating an example of a data format stored in a translucency cache memory of the information processing device according to the first embodiment.

FIG. 12 illustrates an example of a data format stored in the translucency cache memory 122. With the data format illustrated in FIG. 12, the translucency cache memory 122 stores band data (i.e., translucent plane band data) of a translucent plane (i.e., a destination transmission plane) holding the translucency values for the translucent image processing. The translucent plane band data of the destination transmission plane holding the translucency values for the translucent image processing is rendered based on the result of analysis of the PDL data such as the PDF data.

As illustrated in FIG. 12, the data format of the translucency cache memory 122 includes translucency values (i.e., parameters of the translucent image processing) T1, T2, T3, and T4 corresponding to the attribute (A) and the respective pixels of the RGB color components. In this data format, the translucency value of each of the pixels of the planes is allocated with eight bits. That is, the translucent plane band data is 32-bit, translucent plane image data (i.e., a translucent image) in which the translucency value of each of the pixels of the planes has a bit depth of eight bits.

Referring back to FIG. 7, the bus I/F 125 establishes connection with the bus 160 such that the bus I/F 125 and the bus 160 intercommunicate with each other. The ASIC 120 connects to the main controller 110 via the bus I/F 125 to thereby connect to the main memory 140.

The DMA controller 124 reads the rendering commands from the rendering command area 141 of the main memory 140, and transfers the rendering commands to the rendering command storage area 151 of the image memory 150.

The image processing unit 123 reads the multi-valued color band image from the multi-valued color band image storage area 152 of the image memory 150, performs predetermined image processing on the multi-valued color band image, and transfers the processed multi-valued color band image to the few-valued CMYK image storage area 153. Herein, the predetermined image processing includes, for example, the color conversion process of converting the multi-valued color band image into the CMYK multi-valued image and the gradation process of converting the CMYK multi-valued image into the few-valued CMYK image.

The few-valued image reading unit 127 reads the few-valued CMYK image from the few-valued CMYK image storage area 153 of the image memory 150, decodes the few-valued CMYK image, and transfers the decoded few-valued CMYK image to the engine controller 128.

A process using the image memory 150 is executed via the image memory controller 126. That is, the image memory controller 126 controls the access to the image memory 150 in accordance with a memory access request from the DMA controller 124, the image processing unit 123, or the rendering unit 121.

The engine controller 128 controls (i.e., causes) the printer engine 400 to print the decoded image.

Figure 13:
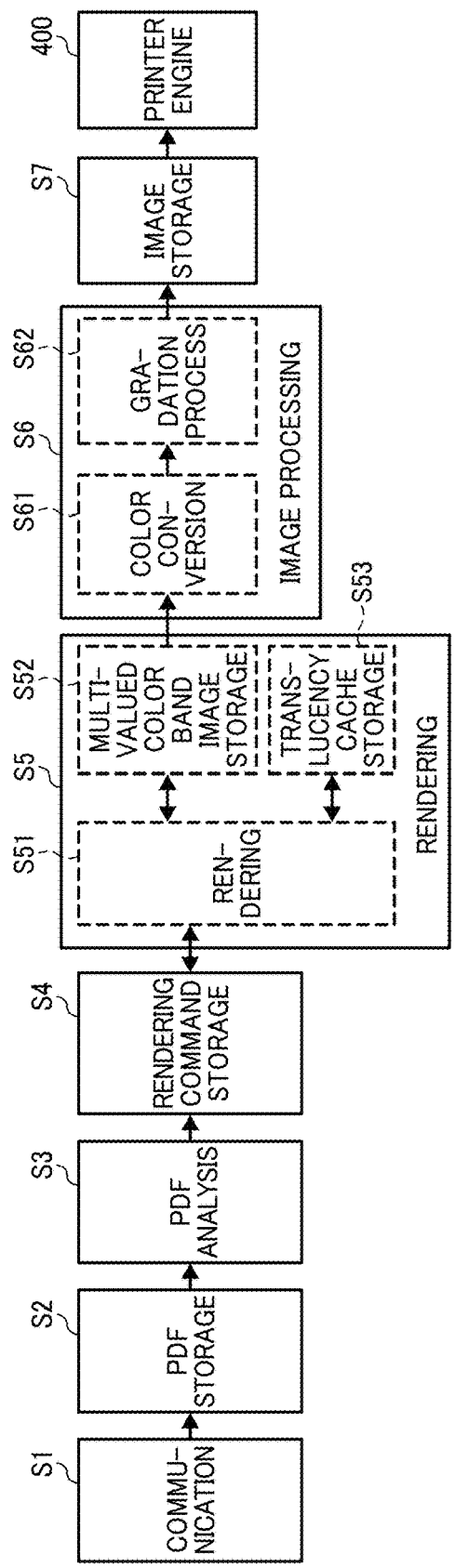
FIG. 13 is a flowchart illustrating an example of information processing according to the first embodiment.

With reference to FIG. 13, a description will be given of an example of an information processing method executed by the printer 1000 (i.e., the image processing apparatus) according to the present embodiment.

As illustrated in FIG. 13, the present information processing includes a communication step S1, a PDF storage step S2, a PDF analysis step S3, a rendering command storage step S4, a rendering step S5, an image processing step S6, and an image storage step S7, which are executed in this order.

At the communication step S1, the controller 100 receives the PDL from the PC 200 via the communication controller 117, as illustrated in FIG. 7. It is assumed that the controller 100 receives the PDF data in the present example. At the PDF storage step S2, the received PDF data is stored in the PDF area 142 of the main memory 140. At the PDF analysis step S3, the CPU 111 executes the computer program to analyze the PDF data stored in the main memory 140.

At the rendering command storage step S4, the rendering commands obtained from the analyzed PDF data are stored in the rendering command area 141 of the main memory 140. The rendering commands stored in the rendering command area 141 are transferred to and stored in the rendering command storage area 151 of the image memory 150 via the bus I/F 125.

At the rendering step S5, the rendering unit 121 reads the rendering commands from the rendering command storage area 151 via the image memory controller 126. The rendering step S5 includes a rendering step S51, a multi-valued color band image storage step S52, and a translucency cache storage step S53.

Specifically, at the rendering step S51, the rendering unit 121 executes the translucency calculation based on the rendering commands. Then, at the multi-valued color band image storage step S52, the rendering unit 121 renders the multi-valued color band image in the multi-valued color band image storage area 152. Further, at the translucency cache storage step S53, the rendering unit 121 renders the translucency value in the translucency cache memory 122. In the rendering process on the multi-valued color band image storage area 152 of the image memory 150, the color values are stored in the multi-valued color band image storage area 152. In the rendering process on the translucency cache memory 122, the translucency values are stored in the translucency cache memory 122. At the rendering step S5, therefore, a loop of the rendering step S51 and the multi-valued color band image storage step S52 and a loop of the rendering step S51 and the translucency cache storage step S53 are repeated as necessary.

If the rendering command currently processed is a page group command, the rendering unit 121 executes the page group processing to further perform a rendering process using the color values of the multi-valued color band image, the translucency values, and the fixed values.

The image processing step S6 includes a color conversion step S61 and a gradation step S62. At the color conversion step S61, a color conversion unit of the image processing unit 123 reads from the multi-valued color band image storage area 152 the RGB values of the image subjected to the page group processing, and color-converts the RGB values into CMYK values (i.e., a CMYK conversion process). At the gradation step S62, a gradation unit of the image processing unit 123 performs the gradation process. With the gradation step S62, the CMYK image subjected to the CMYK conversion process is converted into a few-valued CMYK image. Herein, the RGB values are color data for the image processing, and may also be referred to as color values.

At the image storage step S7, the few-valued CMYK image is stored in the few-valued CMYK image storage area 153 of the image memory 150.

After the image storage step S7, the printer engine 400 prints out the few-valued CMYK image stored in the few-valued CMYK image storage area 153 of the image memory 150.

A hardware configuration of the rendering unit 121 of the ASIC 120 according to the present embodiment will now be described with reference to FIG. 14.

The rendering unit 121 is a hardware resource used to execute the rendering step S5. The rendering unit 121 serves as a translucent image rendering unit and also as a page group processing unit.

Figure 14:
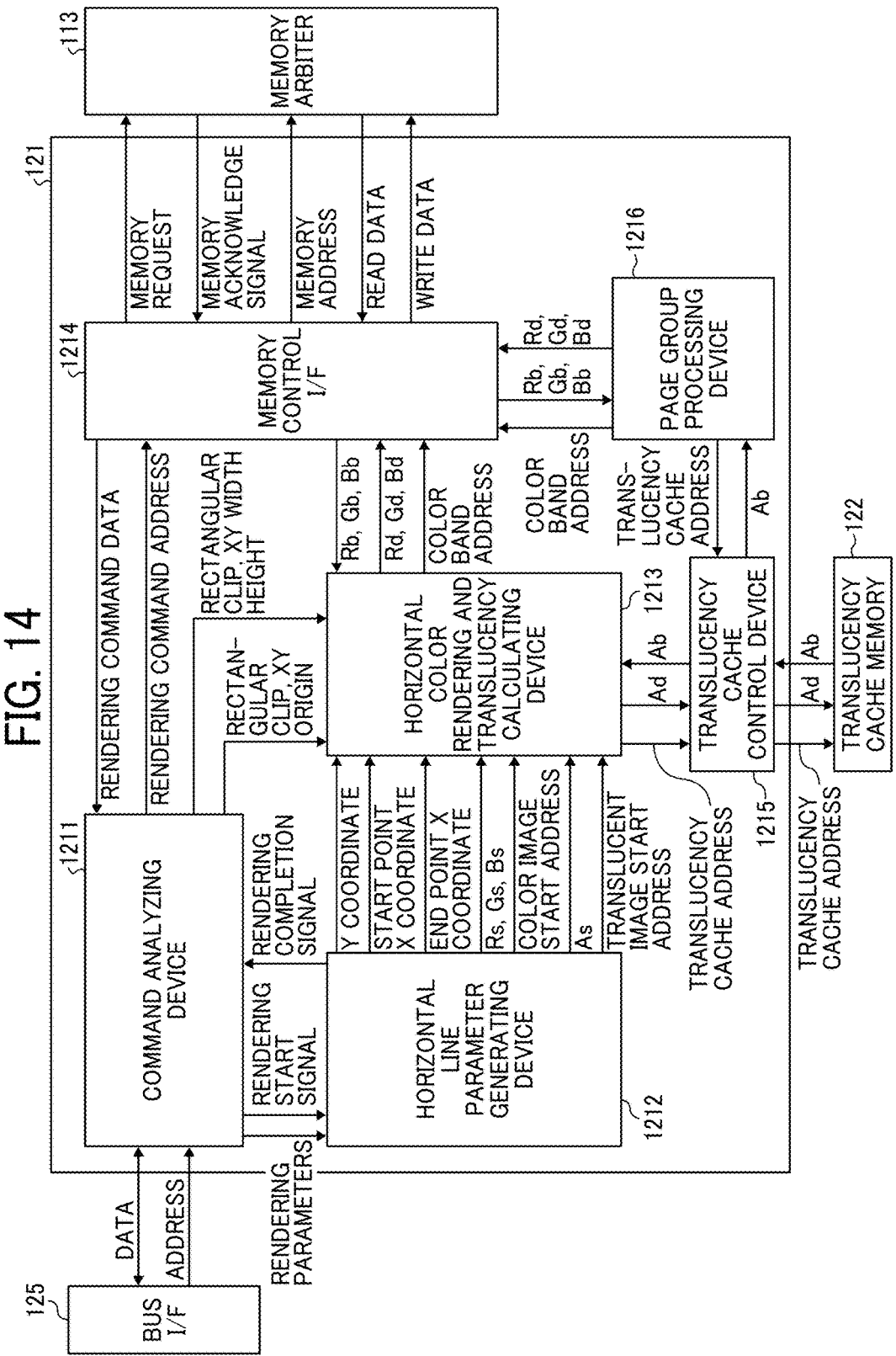
FIG. 14 is a hardware configuration diagram illustrating an example of a rendering unit of the information processing device according to the first embodiment.

As illustrated in FIG. 14, the rendering unit 121 includes a command analyzing device 1211, a horizontal line parameter generating device 1212, a horizontal color rendering and translucency calculating device 1213, a memory control I/F 1214, a translucency cache control device 1215, and a page group processing device 1216.

The command analyzing device 1211 analyzes each of the rendering commands read from the rendering command storage area 151 of the image memory 150. If it is found from the analysis that the rendering command instructs to render a specific image such as a figure, the command analyzing device 1211 transmits rendering parameters therefor to the horizontal line parameter generating device 1212, and then transmits a rendering start signal to the horizontal line parameter generating device 1212. Thereafter, the command analyzing device 1211 receives a rendering completion signal from the horizontal line parameter generating device 1212, and reads the next rendering command.

If it is found from the analysis that the rendering command is the page group command, the command analyzing device 1211 transmits rendering parameters therefor to the page group processing device 1216, and then transmits a start signal to the page group processing device 1216. Thereafter, the command analyzing device 1211 receives a completion signal from the page group processing device 1216, and reads the next rendering command.

If it is found from the analysis that the rendering command is a completion command, the command analyzing device 1211 completes the processing thereof.

The horizontal line parameter generating device 1212 receives the rendering parameters transmitted from the command analyzing device 1211. Based on the received rendering parameters, the horizontal line parameter generating device 1212 calculates, for each of horizontal lines, a Y coordinate (IY), a start point X coordinate (XS), an end point X coordinate (XE), RGB values (Rs, Gs, Bs) to be rendered, and a translucency value (As) to be rendered (hereinafter simply referred to as the horizontal line parameters). The horizontal line parameter generating device 1212 then transfers the calculated horizontal line parameters to the horizontal color rendering and translucency calculating device 1213.

The horizontal color rendering and translucency calculating device 1213 receives the above-described horizontal line parameters from the horizontal line parameter generating device 1212. Based on the received horizontal line parameters, the horizontal color rendering and translucency calculating device 1213 reads color values (Rb, Gb, Bb) and a translucency value (Ab) from the multi-valued color band image storage area 152 of the image memory 150 and the translucency cache memory 122, respectively.

The horizontal color rendering and translucency calculating device 1213 executes the translucency calculation with the read horizontal line parameters, and writes color values (Rd, Gd, Bd) and a translucency value (Ad) obtained from the translucency calculation back to the multi-valued color band image storage area 152 of the image memory 150 and the translucency cache memory 122, respectively.

The translucency cache control device 1215 receives the translucency value (Ad) rendered by the horizontal color rendering and translucency calculating device 1213, and writes the translucency value (Ad) to the translucency cache memory 122 included in the cache memory of the ASIC 120. The translucency cache control device 1215 further reads the translucency value (Ab) from the translucency cache memory 122 in response to a request from the page group processing device 1216.

The page group processing device 1216 receives the rendering parameters from the command analyzing device 1211. The page group processing device 1216 further receives the color values (Rb, Gb, Bb) and the translucency value (Ab) from the multi-valued color band image storage area 152 of the image memory 150 and the translucency cache memory 122, respectively. Based on the rendering parameters, the color values (Rb, Gb, Bb), and the translucency value (Ab) thus received, the page group processing device 1216 performs the page group processing, and writes the result of the page group processing back to the multi-valued color band image storage area 152 of the image memory 150.

The memory control I/F 1214 receives memory addresses and the color values (Rd, Gd, Bd) to be rendered from the horizontal color rendering and translucency calculating device 1213, and connects to the memory arbiter 113 of the main controller 110 such that the memory control I/F 1214 and the memory arbiter 113 intercommunicate with each other.

An example of the rendering commands analyzed by the command analyzing device 1211 will be described.

Figure 15:
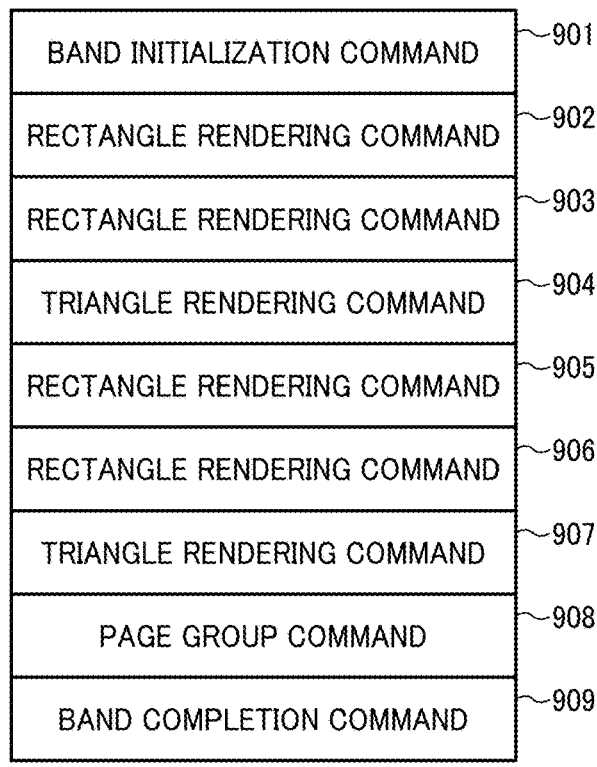
FIG. 15 is a diagram illustrating an example of rendering commands according to the first embodiment.

FIG. 15 illustrates an example of the rendering commands generated at the PDF analysis step S3 described above with reference to FIG. 13. As illustrated in FIG. 15, the rendering commands start with a band initialization command 901 and end with a band completion command 909.

Figure 16:
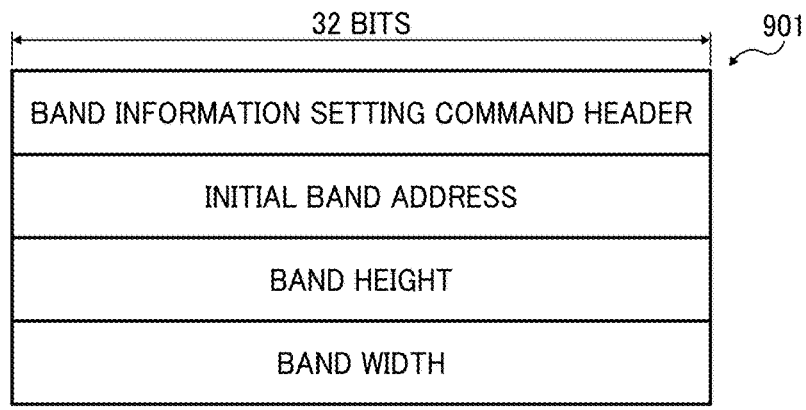
FIGS. 16 to 20 are diagrams each illustrating an example of one of the rendering commands according to the first embodiment.
Figure 17:
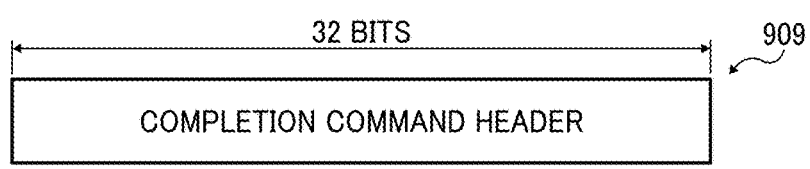

FIGS. 16 to 20 are diagrams illustrating format examples of the rendering commands. FIG. 16 illustrates an example of the format of the band initialization command 901. The band initialization command 901 includes data items each having a data length of 32 bits to specify the initial address for rendering the band image and the height and width of the band for specifying the band size. FIG. 17 illustrates an example of the format of the band completion command 909.

Figure 18:
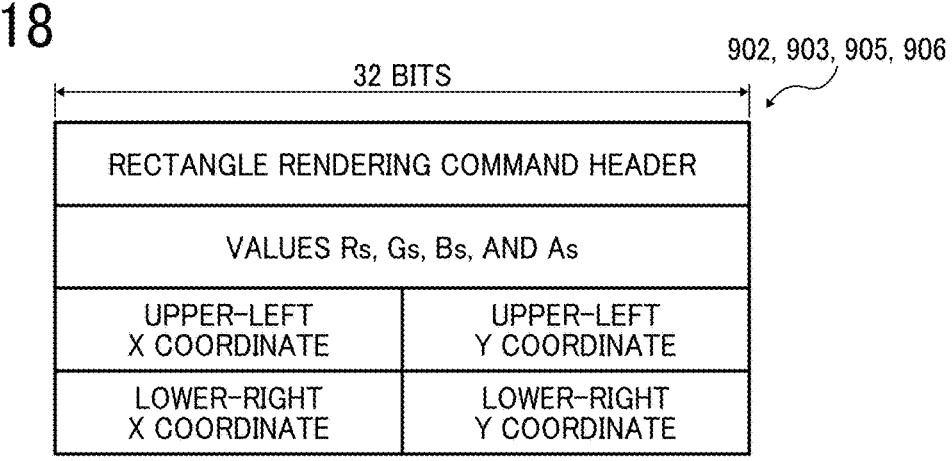

FIG. 18 illustrates an example of the format of each of rectangle rendering commands 902, 903, 905, and 906 in FIG. 15 for rendering a rectangle. From the head of the format, the format includes a rectangle rendering command header indicating that the rendering command is for rendering a rectangle, the RGB values (Rs, Gs, Bs) and the translucency value (As) for rendering the figure (i.e., rectangle), and coordinate values representing the positions of opposite angles for rendering the rectangle.

Figure 19:
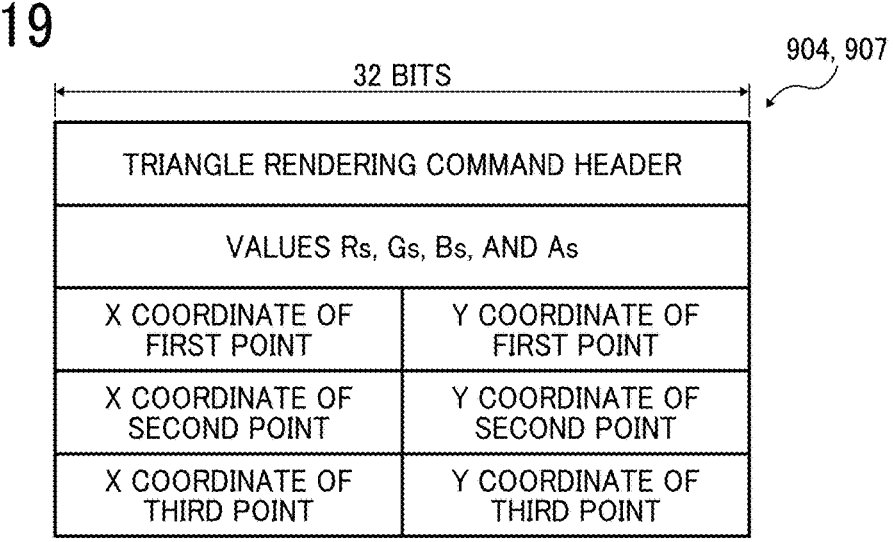

FIG. 19 illustrates an example of the format of each of triangle rendering commands 904 and 907 in FIG. 15 for rendering a triangle. From the head of the format, the format includes a triangle rendering command header indicating that the rendering command is for rendering a triangle, the RGB values (Rs, Gs, Bs) and the translucency value (As) for rendering the figure (i.e., triangle), and coordinate values of three points for rendering the triangle.

Figure 20:
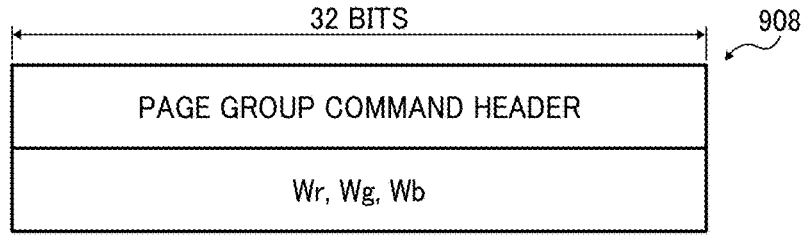

FIG. 20 illustrates an example of the format of a page group command 908 in FIG. 15 for executing the page group processing. The page group command 908 instructs to execute the translucent image processing with fixed values (Wr, Wg, Wb) of a fixed color specified for each of bands, the multi-valued color band image, and the translucent image stored in the translucency cache memory 122. Accordingly, the page group command 908 includes the fixed values (Wr, Wg, Wb) of the fixed color.

Figure 21:
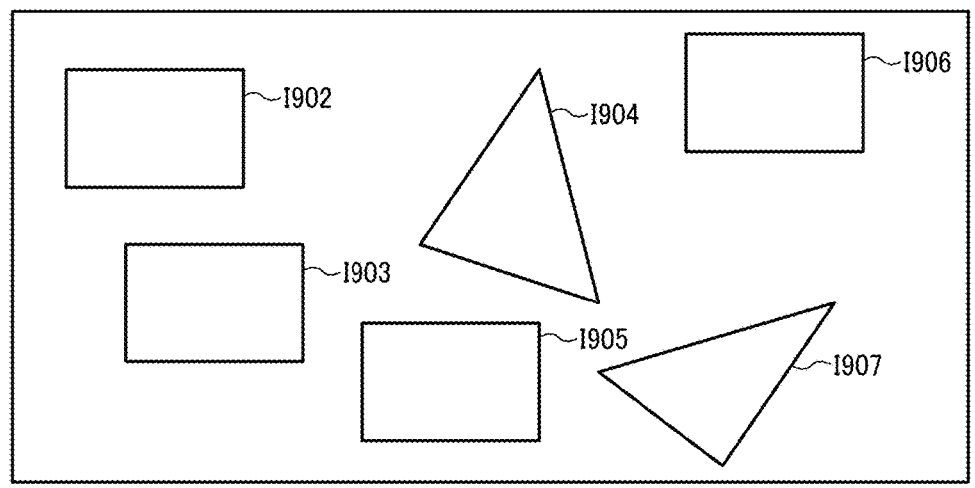
FIG. 21 is a diagram illustrating an example of images rendered based on the rendering commands according to the first embodiment.

FIG. 21 illustrates an example of images rendered with the rendering commands 901 to 909 in FIG. 15. Images 1902, 1903, 1904, 1905, 1906, and 1907 in FIG. 21 correspond to the rendering commands 902, 903, 904, 905, 906, and 907 in FIG. 15, respectively. That is, one figure is rendered based on one rendering command.

A procedure of the operation performed by the rendering unit 121 of the ASIC 120 will be described with reference to the flowchart of FIG. 22.

Figure 22:
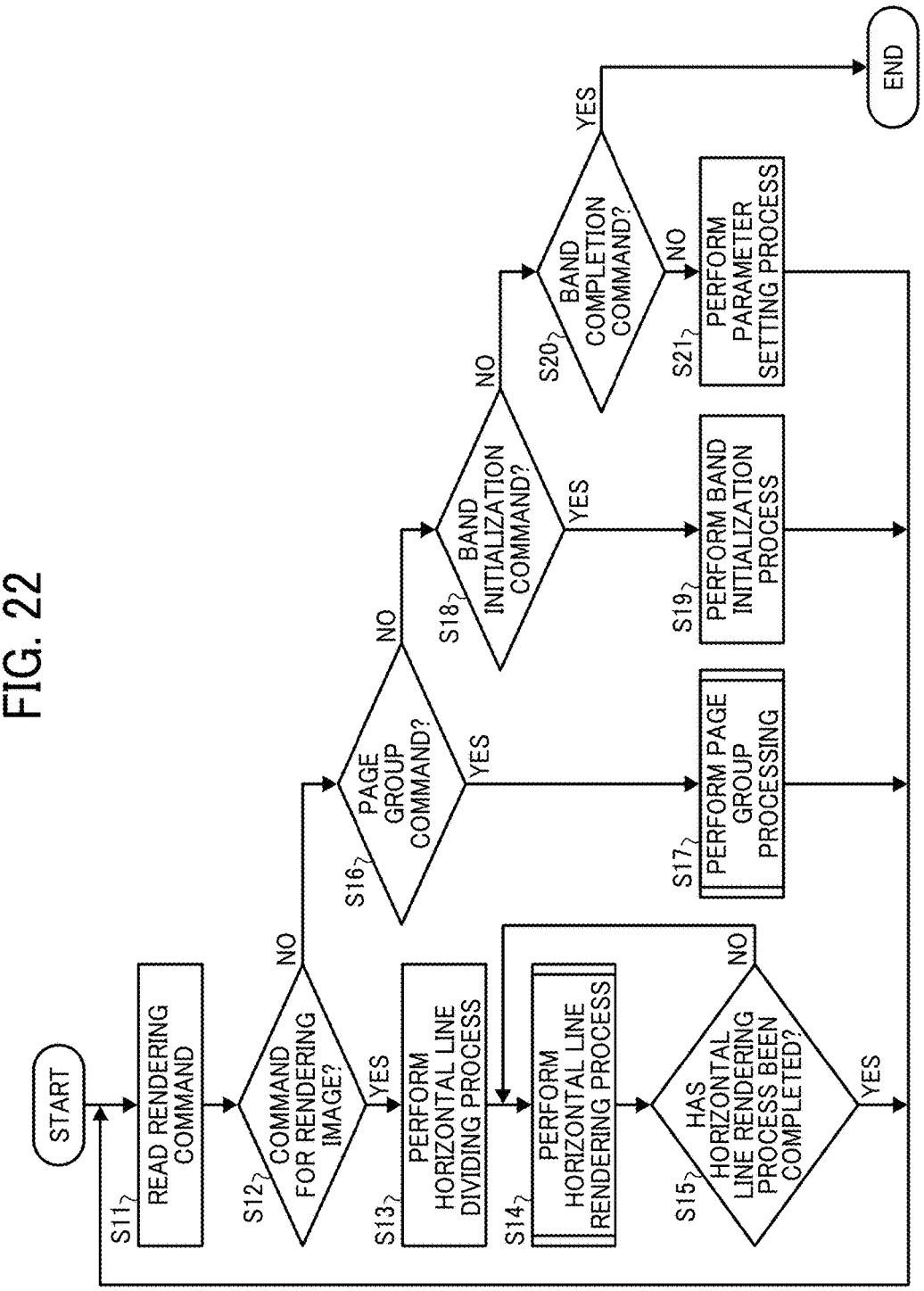
FIG. 22 is a flowchart illustrating an example of a rendering process according to the first embodiment.

As illustrated in FIG. 22, the rendering commands are first read (step S11). As described above, the DMA controller 124 transfers the rendering commands from the rendering command area 141 of the main memory 140 to the rendering command storage area 151 of the image memory 150 to store the rendering commands in the rendering command storage area 151. At step S11, the command analyzing device 1211 reads each of these stored rendering commands.

The command analyzing device 1211 then determines the type and contents of the read rendering command (step S12). If the read rendering command is the command for rendering an image such as a figure (YES at step S12), the command analyzing device 1211 proceeds to a horizontal line dividing process, and transmits the rendering parameters to the horizontal line parameter generating device 1212 (step S13).

The command analyzing device 1211 then transmits the rendering start signal to the horizontal line parameter generating device 1212. Thereby, the horizontal color rendering and translucency calculating device 1213 executes a horizontal line rendering process (step S14). Details of the horizontal line rendering process will be described later with reference to FIG. 23.

If the horizontal line rendering process by the horizontal color rendering and translucency calculating device 1213 is not completed (NO at step S15), a loop of steps S14 and S15 is repeated until the horizontal line rendering process is completed. If the horizontal line rendering process is completed (YES at step S15), the horizontal line parameter generating device 1212 transmits the rendering completion signal to the command analyzing device 1211. Thereby, the procedure proceeds to the process of reading the next rendering command (step S11).

If it is determined at step S12 that the read rendering command is not the command for rendering an image such as a figure (NO at step S12), the command analyzing device 1211 determines whether the read rendering command is the page group command (step S16). If the rendering command is the page group command (YES at step S16), the rendering unit 121 the page group processing is executed (step S17). Details of the page group processing will be described later with reference to FIG. 25.

If it is determined at step S16 that the rendering command is not the page group command (NO at step S16), the command analyzing device 1211 determines whether the rendering command is the band initialization command (step S18). If it is determined at step S18 that the rendering command is the band initialization command (YES at step S18), a band initialization process is executed (step S19). If it is determined at step S18 that the rendering command is not the band initialization command (NO at step S18), the command analyzing device 1211 determines whether the rendering command is the band completion command (step S20).

If it is determined at step S20 that the rendering command is the band completion command (YES at step S20), the present operation is completed. If it is determined at step S20 that the rendering command is not the band completion command (NO at step S20), the rendering command is determined as the parameter setting command. Therefore, a parameter setting process is executed (step S21), and the procedure returns to the rendering command reading process (step S11).

Figure 23:
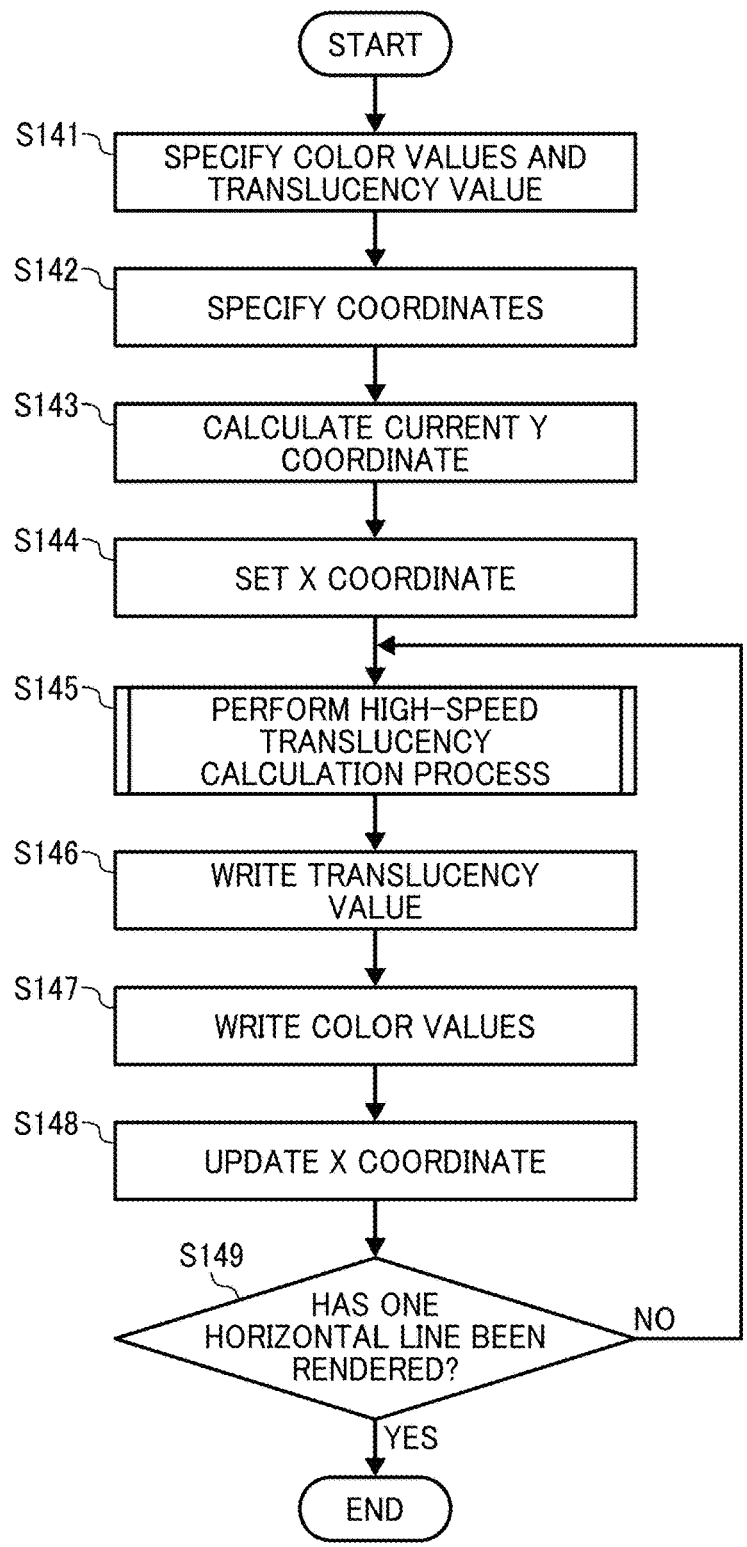
FIG. 23 is a flowchart illustrating an example of a horizontal line rendering process according to the first embodiment.

Details of the horizontal line rendering process at step S14 will be described with reference to the flowchart of FIG. 23.

The horizontal color rendering and translucency calculating device 1213 first specifies the color values (Rs, Gs, Bs) and the translucency value (As) of the horizontal line to be rendered (step S141). Herein, Rs, Gs, Bs, and As respectively represent the R value, the G value, the B value, and the translucency value of the horizontal line to be rendered.

The horizontal color rendering and translucency calculating device 1213 then specifies the respective values of the start point X coordinate (XS), the end point X coordinate (XE), and the Y coordinate of the horizontal line to be rendered (step S142).

Subsequently, the horizontal color rendering and translucency calculating device 1213 calculates the Y coordinate (IY) of coordinates (IX, IY) of the currently processed band image (hereinafter referred to as the band coordinates (IX, IY)) (step S143). Specifically, the horizontal color rendering and translucency calculating device 1213 subtracts a band offset value from the value of the Y coordinate of the currently processed horizontal line, to thereby calculate the Y coordinate (IY) of the currently processed band coordinates (IX, IY).

The horizontal color rendering and translucency calculating device 1213 then specifies the X coordinate (IX) of the currently processed band coordinates (IX, IY) as the start point X coordinate (XS). Specifically, the horizontal color rendering and translucency calculating device 1213 sets the X coordinate that changes during the horizontal line rendering process as the start point X coordinate (XS) specified by the parameter.

Subsequently, the horizontal color rendering and translucency calculating device 1213 executes a high-speed translucency calculation process (step S145), and writes the translucency value (Ad) to the storage area in the translucency cache memory 122 indicated by the respective values of the band coordinates (IX, IY) (step S146). The high-speed translucency calculation process will be described later with reference to FIG. 24.

The horizontal color rendering and translucency calculating device 1213 then writes the color values (Rs, Gs, Bs) to the storage area in the multi-valued color band image storage area 152 of the image memory 150 indicated by the respective values of the band coordinates (IX, IY) (step S147), and increments the value of the X coordinate (IX) to update the X coordinate (IX) for the horizontal line rendering (step S148).

If the value of the X coordinate (IX) does not exceed the value of the end point X coordinate (XE), the rendering of one horizontal line is not completed (NO at step S149). Therefore, a loop of steps S145 to S149 is repeated to again execute the high-speed translucency calculation process. If the value of the X coordinate (IX) exceeds the value of the end point X coordinate (XE), the rendering of one horizontal line is completed (YES at step S149). Accordingly, the horizontal line rendering process is completed.

A schematic procedure of the high-speed translucency calculation process at step S145 will be described with reference to FIG. 24.

Figure 24:
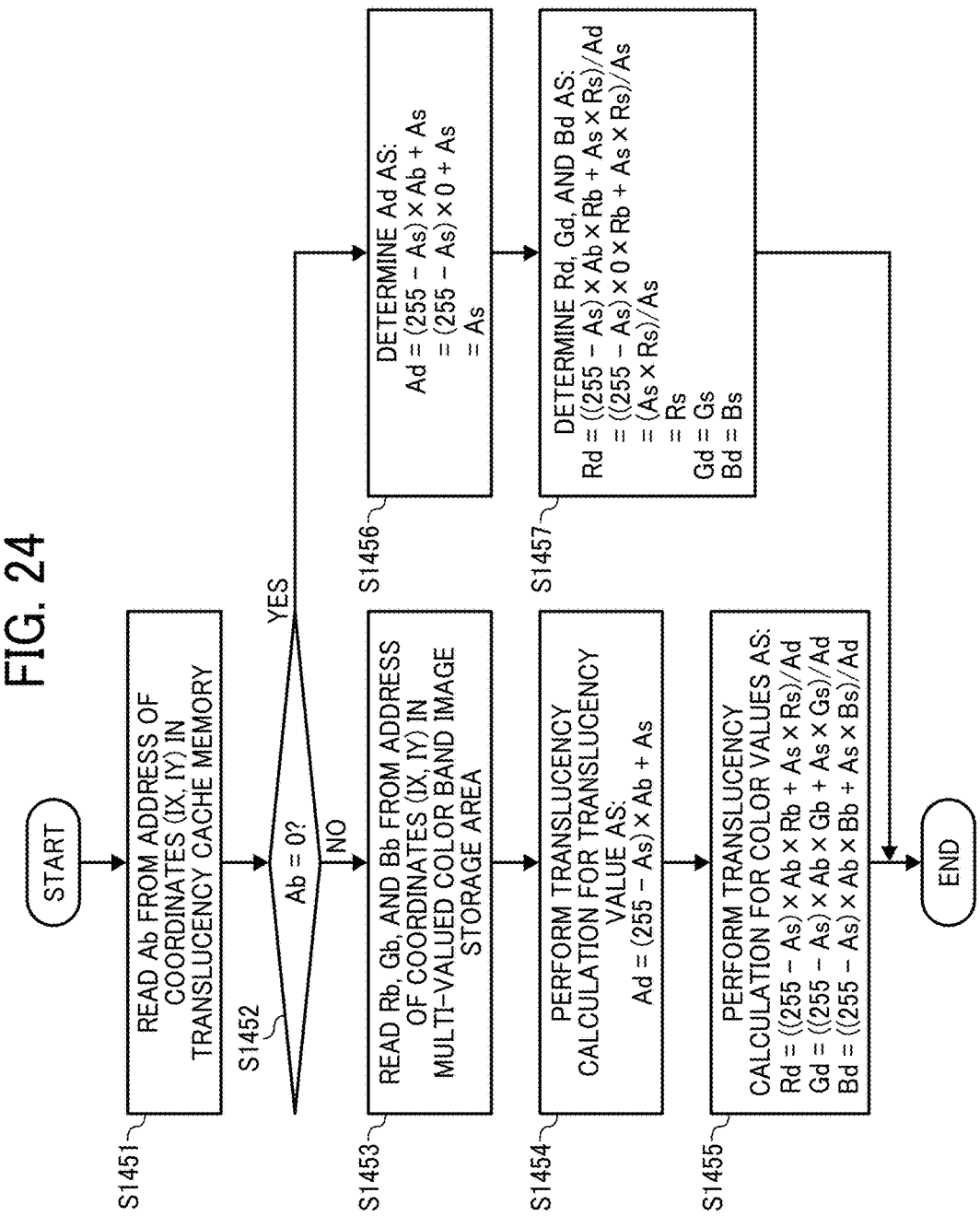
FIG. 24 is a flowchart illustrating an example of a high-speed translucency calculation process according to the first embodiment.

FIG. 24 is a flowchart illustrating the logic of the high-speed translucency calculation process. The flowchart of FIG. 24 is intended not to illustrate steps of software processing for executing the high-speed translucency calculation process, but to illustrate a principle enabling the translucency calculation at high speed.

The translucency value (Ab) indicated by the band coordinates (IX, IY) of the currently processed band image in the horizontal line rendering process at step S14 is first read from the translucency cache memory 122 (step S1451).

Then, whether the read translucency value (Ab) is zero is determined (step S1452). If the read translucency value (Ab) is zero (YES at step S1452), there is no need to execute the translucency calculation process for the band coordinates (IX, IY). Even if the translucency calculation is omitted in this case, the same values as the color values (Rd, Gd, Bd) subjected to the translucency calculation are obtained, as illustrated in steps S1456 and S1457. That is, if the read translucency value (Ab) is zero, the translucency value (Ad) is calculated as $Ad=(255-As)\times Ab+As=(255-As)\times 0+As=As$ (step S1456). Thus, the color values (Rd, Gd, Bd) are calculated as $Rd=((255-As)\times Ab\times Rb+As\times Rs)/Ad=((255-As)\times 0\times Rb+As\times Rs)/As=(As\times Rs)/As=Rs$, $Gd=Gs$, and $Bd=Bs$ (step S1457). Therefore, the reading of the multi-valued color band image is also omitted.

In FIG. 24, Ab, As, and Ad represents the translucency value stored in the translucency cache memory 122, the translucency value to be rendered, and the translucency value subjected to the translucency calculation, respectively. Rb, Gb, and Bb represent the color values stored in the multi-valued color band image storage area 152 of the image memory 150, and Rs, Gs, and Bs represent the color values to be rendered. Further, Rd, Gd, and Bd represent the color values subjected to the translucency calculation.

If the read translucency value (Ab) is not zero (NO at step S1452), the color values (Rb, Gb, Bb) indicated by the respective values of the band coordinates (IX, IY) of the currently processed band image are read from the multi-valued color band image storage area 152 of the image memory 150 (step S1453).

Subsequently, translucency calculation is executed with the translucency value (Ab) (step S1454). That is, the translucency value (Ad) is calculated as $Ad=(255-As)\times Ab+As$. Then, translucency calculation for the color values is executed with the color values (Rb, Gb, Bb) stored in the multi-valued color band image storage area 152, the color values (Rs, Gs, Bs) of the image to be rendered, the translucency value (As) for the image to be rendered, and the translucency values (Ab) and (Ad) (step S1455). That is, the color values (Rd, Gd, Bd) are calculated as $Rd=((255-As)\times Ab\times Rb+As\times Rs)/Ad$, $Gd=((255-As)\times Ab\times Gb+As\times Gs)/Ad$, and $Bd=((255-As)\times Ab\times Bb+As\times Bs)/Ad$.

In the thus-executed high-speed translucency calculation of the present embodiment, the reading and writing of the translucency values Ab, As, and Ad are performed not on a storage area of the image memory 150 but on the translucency cache memory 122 in the cache memory of the ASIC 120. That is, the translucent image used in the rendering process by the rendering unit 121 is expanded in the cache memory.

Accordingly, the translucency calculation process is performed at high speed without being affected by the read latency occurring in a DDR memory such as the image memory 150. The color image is expressed with the RGB values in the present example. The high-speed translucency calculation of the present embodiment, however, is also applicable to the color image expressed with the CMYK values or the monochromatic image expressed with the K value.

Figure 25:
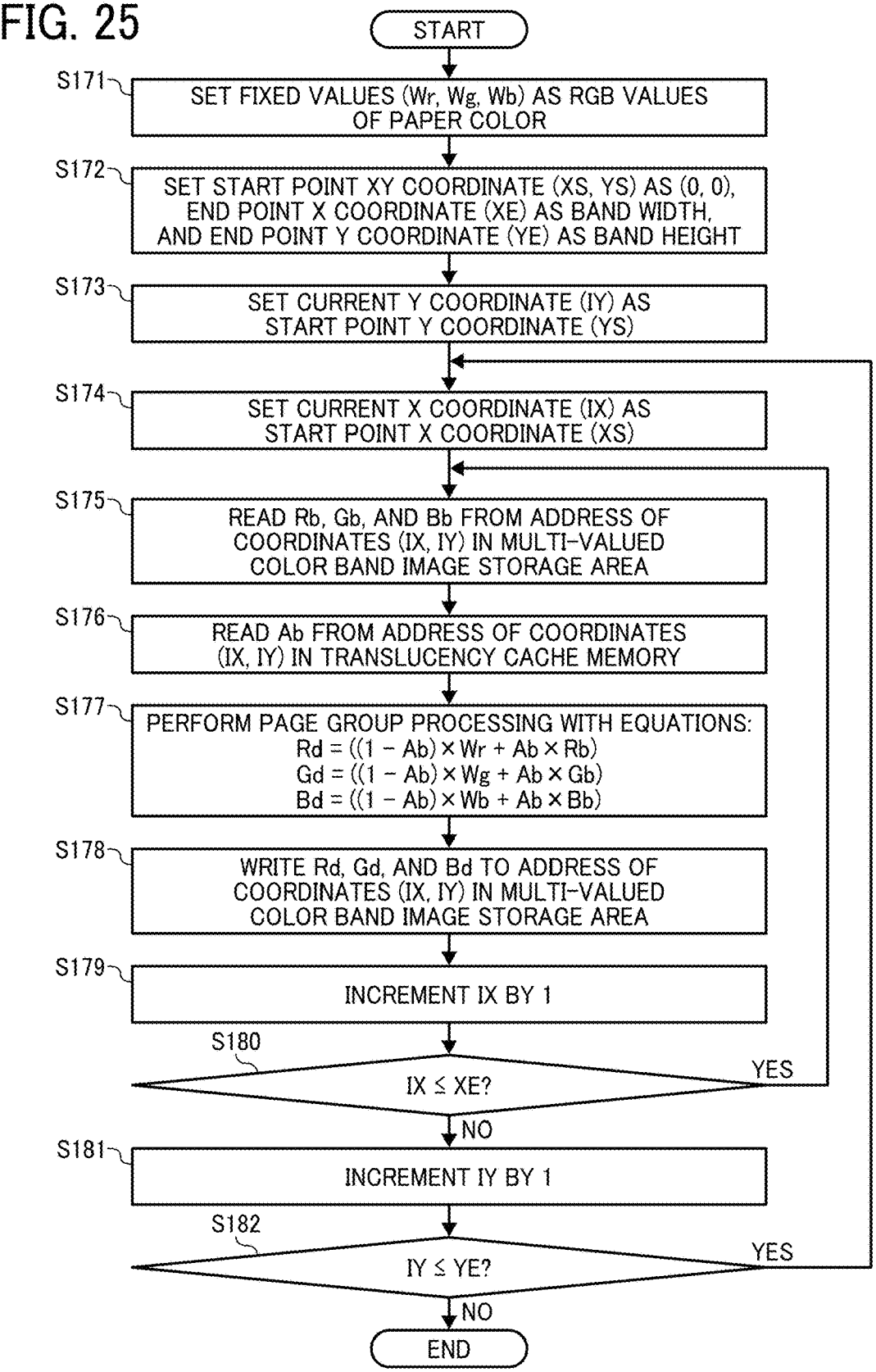
FIG. 25 is a flowchart illustrating an example of page group processing according to the first embodiment.

Details of a procedure of the page group processing at step S17 in FIG. 22 will be described with reference to the flowchart of FIG. 25.

The fixed values (Wr, Wg, Wb) of the fixed color are first set for the RGB components (step S171). The fixed color represented by the fixed values (Wr, Wg, Wb) is the color of paper serving as the recording medium (hereinafter referred to as paper color). In the present example, the R value, the G value, and the B value of the paper color are set as Wr, Wg, and Wb, respectively.

The respective values of the start point X coordinate (XS), the end point X coordinate (XE), a start point Y coordinate (YS), and an end point Y coordinate (YE) of the band image to be processed are then set (step S172). In the present example, the respective values of the start point X coordinate (XS) and the start point Y coordinate (YS) are both zero, and the end point X coordinate (XE) and the end point Y coordinate (YE) correspond to the band width in the X direction and the band height in the Y direction, respectively.

Then, the currently processed Y coordinate (IY) is set (step S173), and the currently processed X coordinate (IX)

is set (step S174). In the present example, the currently processed Y coordinate (IY) is set to the start point Y coordinate (YS), and the currently processed X coordinate (IX) is set to the start point X coordinate (XS).

Subsequently, the color values (Rb, Gb, Bb) indicated by the band coordinates (IX, IY) are read from the multi-valued color band image storage area 152 of the image memory 150 (step S175). Then, the translucency value (Ab) of the translucent band image indicated by the band coordinates (IX, IY) is read from the translucency cache memory 122 (step S176).

The page group processing is then performed (step S177). In the page group processing, the rendering of colors and translucency is performed in page unis and for each of pages, and then the translucency calculation is performed with the rendered colors, the translucency value, and the fixed values to thereby generate colors suitable for rendering on paper.

Specifically, a calculation process is executed with equations (1) given below:

$$Rd=((1-Ab)\times Wr+Ab\times Rb)$$

$$Gd=((1-Ab)\times Wg+Ab\times Gb)$$

$$Bd=((1-Ab)\times Wb+Ab\times Bb) \qquad (1)$$

In equations (1), Rb, Gb, and Bb represent the color values of the color of the band image indicated by the band coordinates (IX, IY). Further, Wr, Wg, and Wb represent the color values of the fixed color (i.e., paper color), and Ab represents the translucency value. Further, Rd, Gd, and Bd represent color values obtained through the translucency calculation process of the page group processing.

Then, the color values (Rd, Gd, Bd) are written to the address in the multi-valued color band image storage area 152 indicated by the band coordinates (IX, IY) (step S178), and the value of the X coordinate (IX) is incremented (step S179).

It is then determined whether the calculation process for one horizontal line has been completed (step S180). If the value of the X coordinate (IX) is equal to or less than the value of the end point X coordinate (XE) (YES at step S180), the calculation process for one horizontal line has not been completed. Thus, a loop of steps S175 to S180 is repeated.

If the value of the X coordinate (IX) exceeds the value of the end point X coordinate (XE) (NO at step S180), the calculation process for one horizontal line has been completed. Thus, the Y coordinate (IY) is updated (step S181), and it is determined whether the calculation for the area corresponding to the band height has been completed (step S182). If the value of the Y coordinate (IY) is equal to or less than the value of the end point Y coordinate (YE) (YES at step S182), the calculation process for the area corresponding to the band height has not been completed. Thus, a loop of steps S174 to S182 is repeated. If the value of the Y coordinate (IY) exceeds the value of the end point Y coordinate (YE) (NO at step S182), the calculation process for the area corresponding to the band height has been completed. Thus, the page group processing is completed.

The color image is expressed with the RGB values in the present example. The page group processing of the present embodiment, however, is also applicable to the color image expressed with the CMYK values or the monochromatic image expressed with the K value.

A reason for the increase in processing speed particularly in the page group processing of the present embodiment will be described with reference to the timing chart of FIGS. 26A and 26B.

Figure 26A:
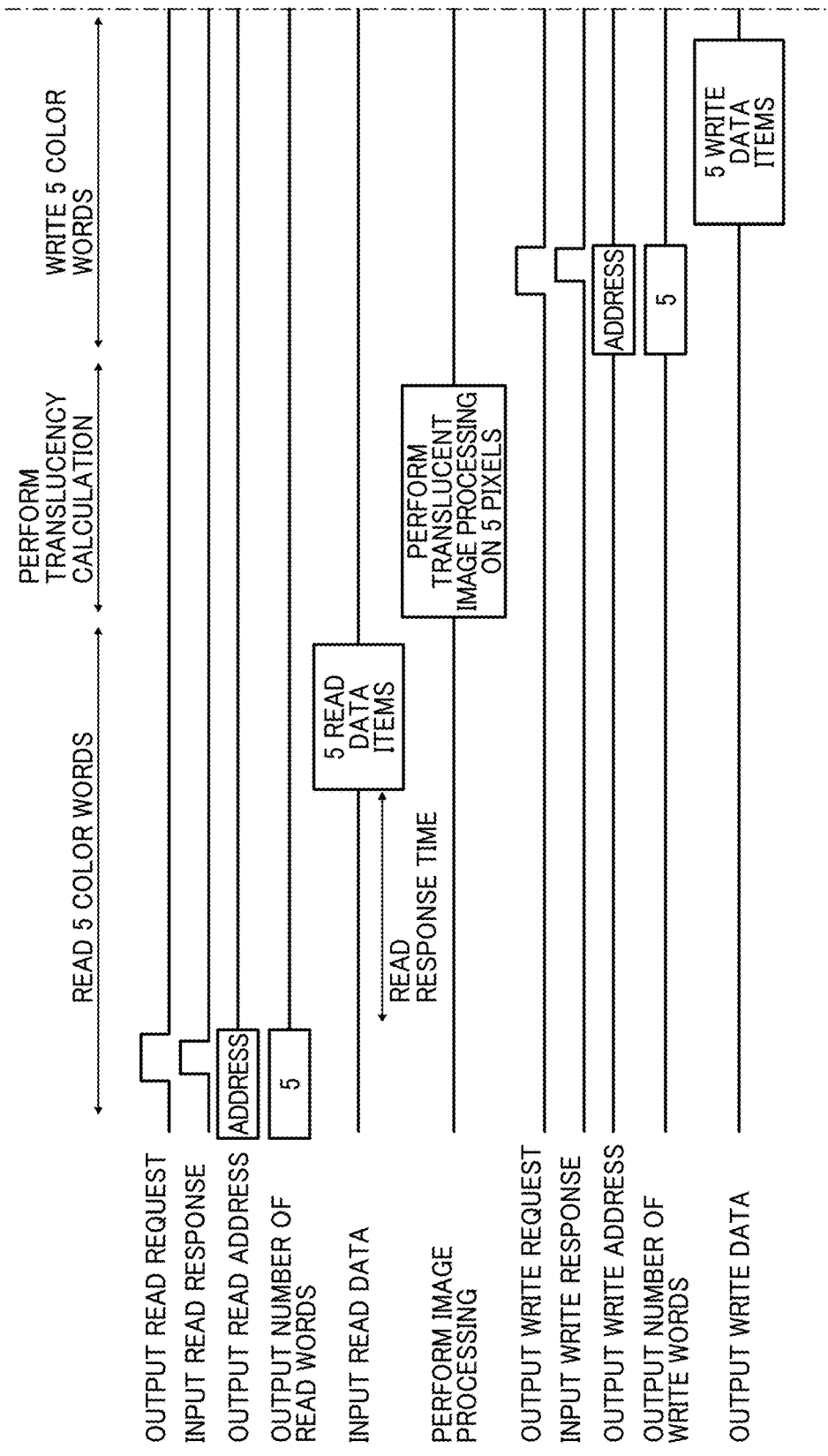
FIGS. 26A and 26B are a timing chart illustrating the example of the page group processing according to the first embodiment.
Figure 26B:
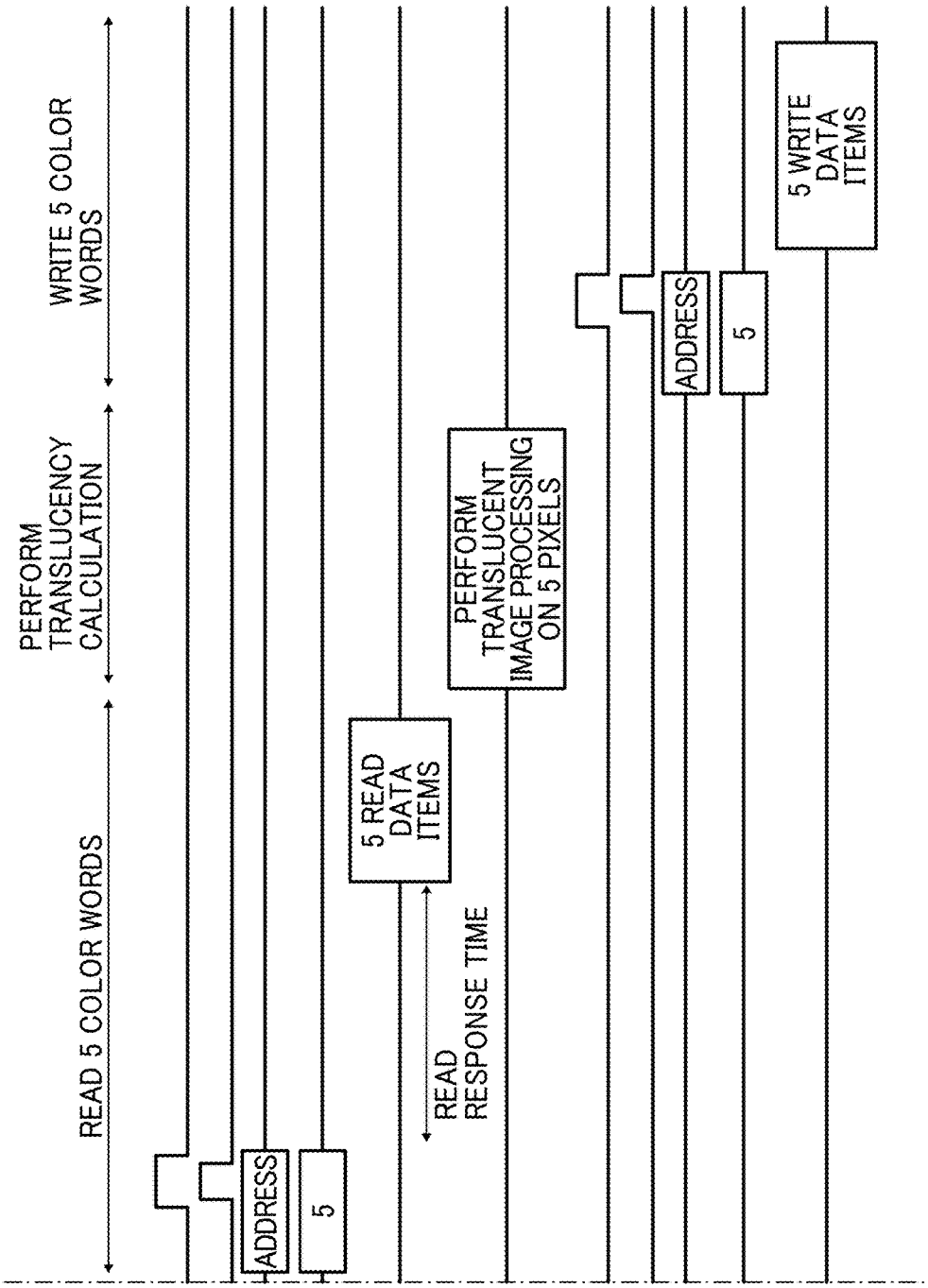

As illustrated in FIGS. 26A and 26B, in the page group processing, a read-modify-write process is performed on the same multi-valued band image. Memory access to the same storage area is normally controlled to wait for the completion of a sequence of read-modify-write processing before the start of the next sequence of processing. This is for preventing a data item newly read and written during the reading of another data item from being overwritten.

A normal rendering process handles multi-bit information such as 128-bit information and 256-bit information, and thus may be performed in processing units transcending rendering word units. Further, with a variety of circuits such as a memory control circuit interposed between a rendering device and a DDR memory, data reading may overtake data writing. To prevent such overtaking, simple memory access, such as that illustrated in the timing chart of FIGS. 26A and 26B, is desirable.

In the ASIC 120 of the present embodiment, the connection between the rendering unit 121 and the image memory 150 is different from the connection between the rendering unit 121 and the translucency cache memory 122. That is, the rendering unit 121 accesses the image memory 150 (i.e., a DDR memory) via the image memory controller 126 (i.e., a memory bus). On the other hand, the rendering unit 121 accesses the translucency cache memory 122 (i.e., a cache memory) not via an interface forming a physical connection point.

On the assumption of such a difference in connection, the access of the rendering unit 121 to the image memory 150 and the access of the rendering unit 121 to the translucency cache memory 122 are controlled to follow the above-described principle. In other words, the translucency value, reading and writing of which complicates the memory access, is stored in the cache memory to prevent data reading from overtaking data writing.

An image processing device according to a second embodiment of the present invention will now be described.

A controller 100*a* as an information processing device of the second embodiment includes components the same as those of the controller 100 of the foregoing first embodiment. Thus, a detailed description of the already described components will be omitted, and the following description will focus on differences of the controller 100*a* of the second embodiment from the controller 100 of the first embodiment.

Figure 27:
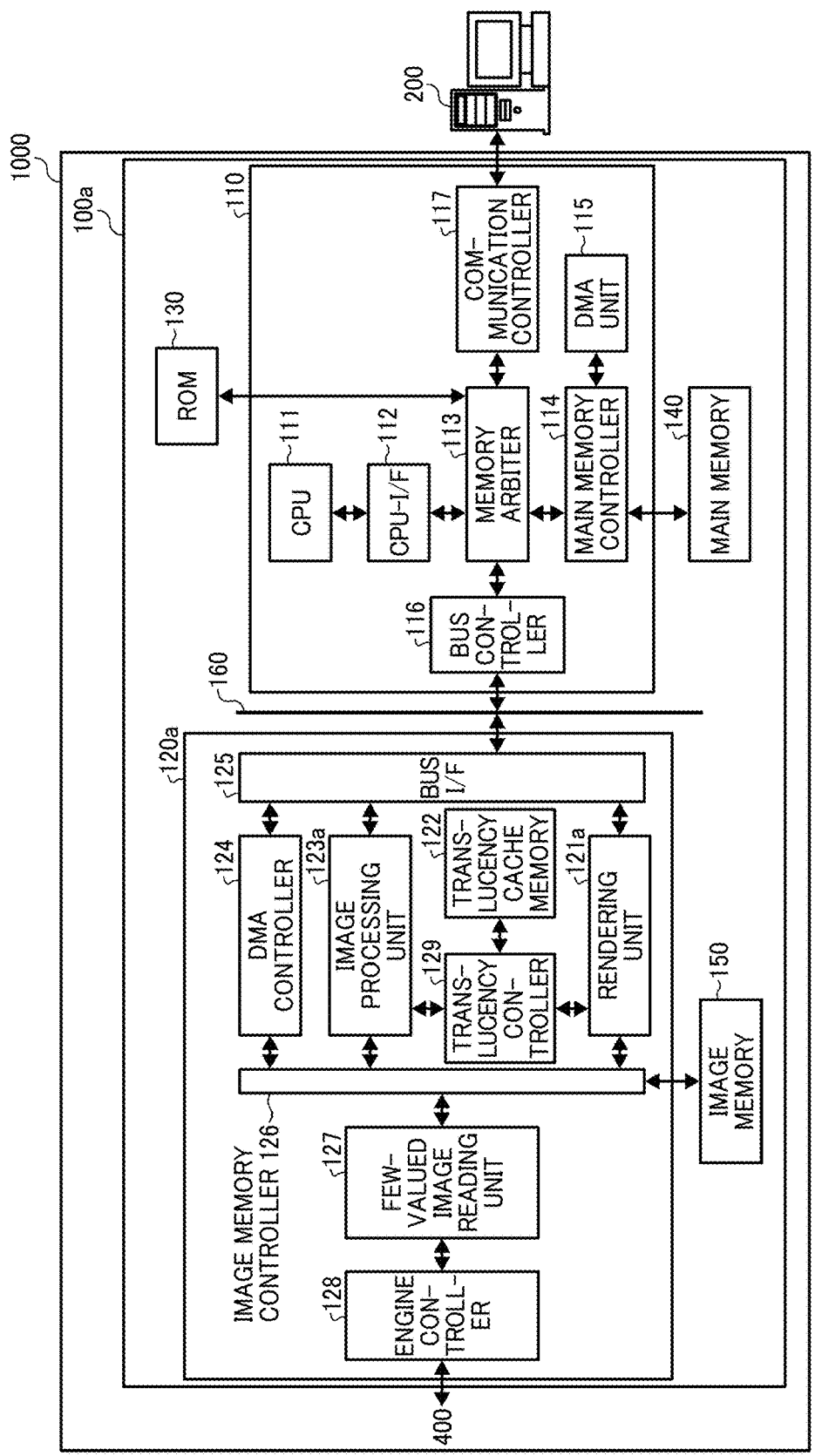
FIG. 27 is a block diagram schematically illustrating a configuration example of an information processing device according to a second embodiment of the present invention.

FIG. 27 is a diagram illustrating a configuration example of the controller 100*a* according to the second embodiment. As illustrated in FIG. 27, the controller 100*a* includes the main controller 110 that controls the operation of the entire controller 100*a*, an ASIC 120*a* for image processing, the ROM 130, the main memory 140, and the image memory 150. The main controller 110 and the ASIC 120*a* are connected to each other via the bus 160.

The controller 100*a* is different from the controller 100 in a rendering unit 121*a*, an image processing unit 123*a*, and a translucency cache controller (i.e., translucency controller in FIG. 27) 129 of the ASIC 120*a*. In the ASIC 120*a* of the second embodiment, the rendering unit 121*a* and the image processing unit 123*a* are configured to share the translucency cache memory 122. Details of the rendering unit 121*a* and the image processing unit 123*a* will be described later.

The translucency cache controller 129 controls the translucency cache memory 122 to control the access of the rendering unit 121a to the translucency cache memory 122 and the access of the image processing unit 123a to the translucency cache memory 122. The translucency cache controller 129 performs control based on access right to prevent the access to the translucency cache memory 122 by one of the rendering unit 121a and the image processing unit 123a during the access to the translucency cache memory 122 by the other one of the rendering unit 121a and the image processing unit 123a.

Figure 28:
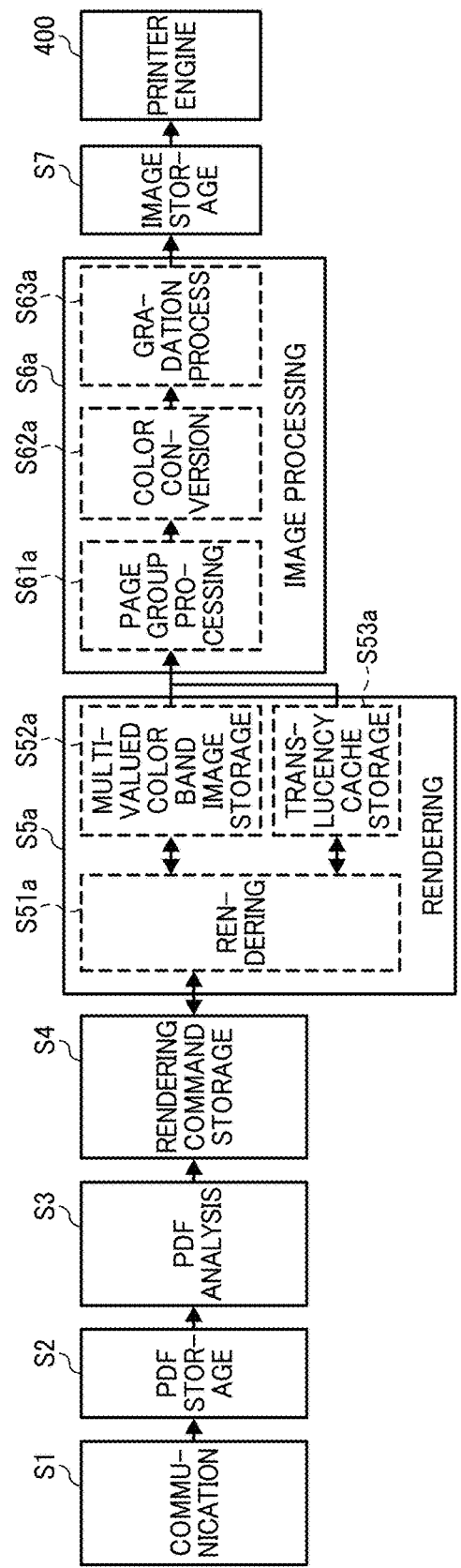
FIG. 28 is a flowchart illustrating an example of information processing according to the second embodiment.

With reference to FIG. 28, a procedure of information processing executed by the controller 100a as the information processing device according to the second embodiment will be described. Detailed description of the processes already described in the foregoing first embodiment with reference to FIG. 13 will be omitted.

The information processing illustrated in FIG. 28 includes the communication step S1, the PDF storage step S2, the PDF analysis step S3, the rendering command storage step S4, a rendering step S5a, an image processing step S6a, and the image storage step S7, which are executed in this order.

The rendering step S5a and the image processing step S6a different from the rendering step S5 and the image processing step S6 of the first embodiment will now be described.

At the rendering step S5a, the rendering unit 121a reads the rendering commands from the rendering command storage area 151 of the image memory 150 via the image memory controller 126, and executes the rendering process based on the rendering commands. Unlike in the first embodiment, after the rendering is performed with the color values and the translucency value obtained by a rendering step S51a, a multi-valued color band image storage step S52a, and a translucency cache storage step S53a, the procedure directly proceeds to the image processing step S6a.

At the image processing step S6a, a page group processing step S61a, a color conversion step S62a, and a gradation step S63a are executed. Unlike the image processing step S6 of the first embodiment, the image processing step S6a of the second embodiment includes the page group processing step S61a. In the color conversion step S62a, the color values subjected to the page group processing are read from the multi-valued color band image storage area 152 and color-converted into the CMYK values (i.e., the CMYK conversion process). At the gradation step S63a, the gradation process is performed to convert the CMYK image subjected to the CMYK conversion process into a few-valued CMYK image.

As described above, the image memory 150 is a DDR memory, and thus the read latency is taken into account. The color values stored in the multi-valued color band image storage area 152 of the image memory 150 are written at the rendering step S51a, and the stored color values and the translucency value are read at the page group processing step S61a. In the second embodiment, the reading from the multi-valued color band image storage area 152 is omitted at the rendering step S5a, unlike in the first embodiment. Consequently, a standby time due to the read latency is reduced, thereby making the overall image processing speed faster than that in the first embodiment.

Further, the second embodiment is modified such that the page group processing step S61a is executed before the color conversion step S62a and the gradation step S63a of the image processing step S6a. This configuration makes it possible to perform the page group processing step S61a on the multi-valued color band image without writing the multi-valued color band image to the image memory 150. Further, in the second embodiment, the multi-valued color band image subjected to the page group processing is received from the DMA controller 124 at the color conversion step S62a. The controller 100a of the second embodiment therefore further increases the speed of the translucent image processing of the page group processing.

A hardware configuration of the rendering unit 121a of the second embodiment will be described with reference to FIG. 29.

The rendering unit 121a is a hardware resource used to execute the rendering step S5a. As illustrated in FIG. 29, the rendering unit 121a includes the command analyzing device 1211, the horizontal line parameter generating device 1212, the horizontal color rendering and translucency calculating device 1213, the memory control I/F 1214, and the translucency cache control device 1215.

Figure 29:
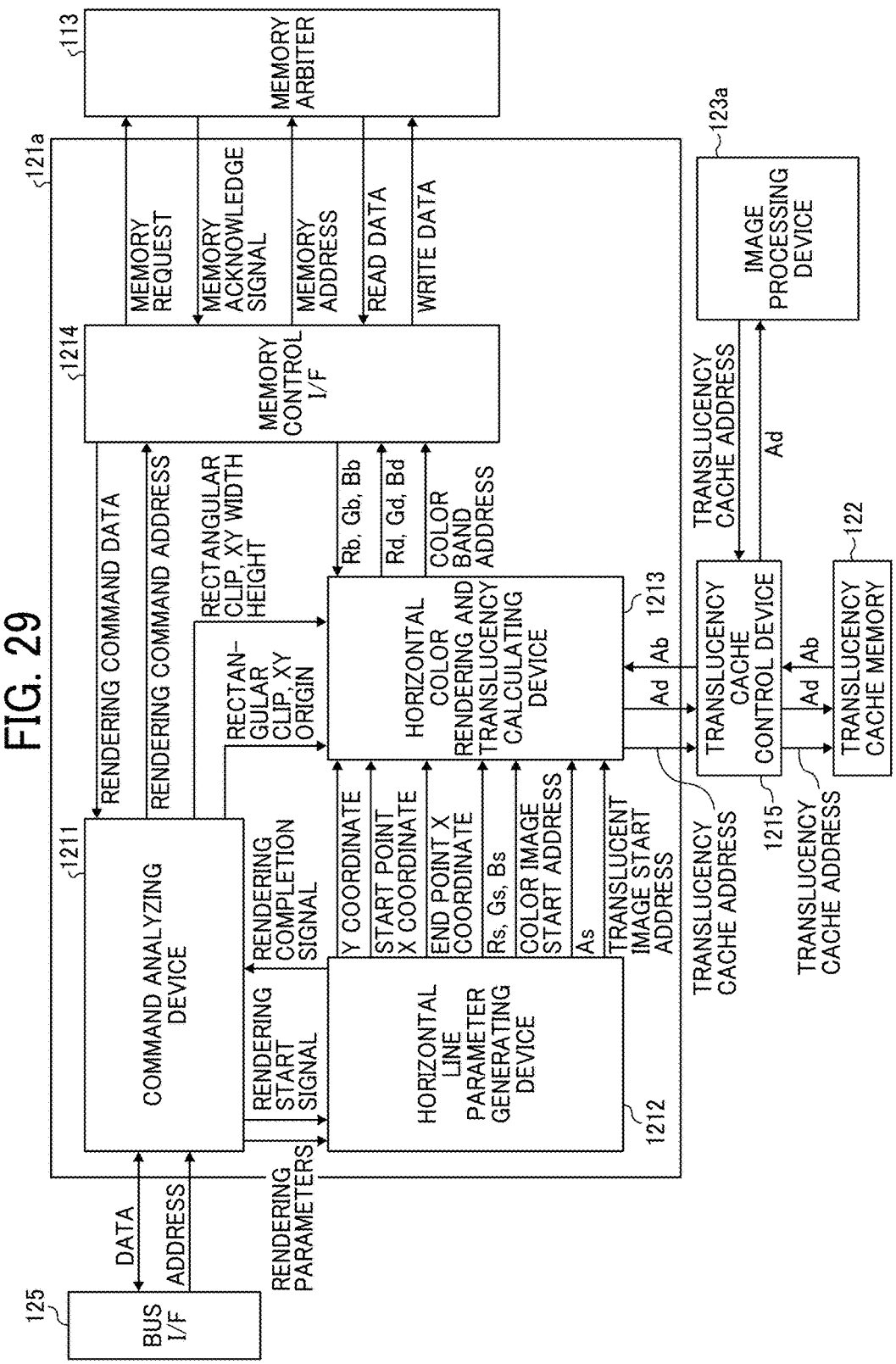
FIG. 29 is a hardware configuration diagram illustrating an example of a rendering unit of the information processing device according to the second embodiment.

Unlike the rendering unit 121 of the first embodiment, the rendering unit 121a of the second embodiment does not include the page group processing device 1216, and does not include therein the translucency cache control device 1215, i.e., the translucency cache control device 1215 is disposed outside the rendering unit 121a, as illustrated in FIG. 29. In the second embodiment, the translucency cache control device 1215 forms a part of a hardware configuration of the translucency cache controller 129.

Figure 30:
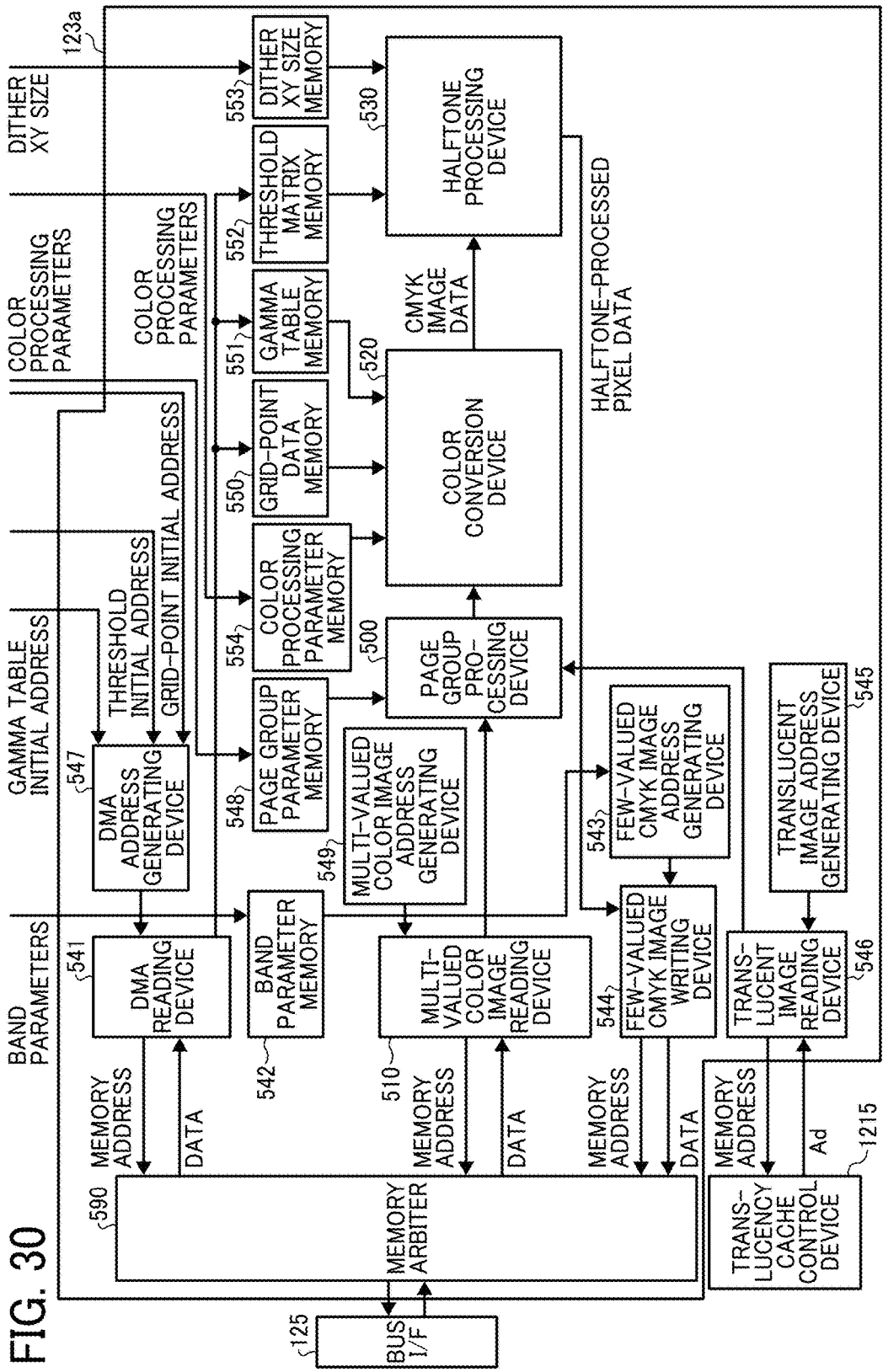
FIG. 30 is a hardware configuration diagram illustrating an example of an image processing unit of the information processing device according to the second embodiment.

A hardware configuration of the image processing unit 123a of the second embodiment will be described with reference to FIG. 30.

The image processing unit 123a is a hardware resource used to execute the image processing step S6a. As illustrated in FIG. 30, the image processing unit 123a includes devices that execute processes related to color conversion and halftone (i.e., gradation). Specifically, the image processing unit 123a includes a page group processing device 500, a multi-valued color image reading device 510, a color conversion device 520, a halftone processing device 530, a DMA reading device 541, a band parameter memory 542, a few-valued CMYK image address generating device 543, a few-valued CMYK image writing device 544, a translucent image address generating device 545, a translucent image reading device 546, a DMA address generating device 547, a page group parameter memory 548, a multi-valued color image address generating device 549, a grid-point data memory 550, a gamma table memory 551, a threshold matrix memory 552, a dither XY size memory 553, a color processing parameter memory 554, and a memory arbiter 590.

The following description will focus on some of these devices related to characteristics of the second embodiment.

The page group processing device 500 receives the translucency value (Ad) from the translucency cache control device 1215, and transmits a translucency cache address. Based on the received translucency value (Ad), the page group processing device 500 performs the page group processing, and informs the translucency cache controller 129 in FIG. 27 of the cache address of the translucency value resulting from the page group processing.

The memory arbiter 590 performs arbitration when the DMA reading device 541, the multi-valued color image reading device 510, the few-valued CMYK image address generating device 543, and the few-valued CMYK image writing device 544 perform data input or data output via the bus I/F 125 in FIG. 27.

The multi-valued color image reading device 510 reads the band image written to the multi-valued color band image storage area 152 of the image memory 150 by the rendering unit 121a.

The color conversion device 520 performs a color space conversion process on the pixel values of the pixel data input by the multi-valued color image reading device 510. The color conversion device 520 converts an RGBA color space of the input pixel data to a CMYK color space. If it is found from a same color flag input to the color conversion device 520 that there are two pixels having the same pixel value, the color conversion device 520 performs the color space conversion on the pixel value of one of the two pixels. The color conversion device 520 outputs the same color flag and CMYK data obtained from the conversion process to the halftone processing device 530.

In addition to the color space conversion, the color conversion device 520 performs processes such as under-color removal and color correction. The color conversion device 520 acquires parameters for these processes from the grid-point data memory 550 and the gamma table memory 551.

The halftone processing device 530 performs a halftone process for each of color components of the CMYK data input by the color conversion device 520. The halftone processing device 530 reads parameters for the halftone process from a halftone parameter memory. The halftone processing device 530 then performs the halftone process for both of odd-numbered pixels and even-numbered pixels of the input CMYK data based on comparison with values included in an odd number threshold matrix and values included in an even number threshold matrix. The halftone processing device 530 outputs pixel data subjected to the halftone process.

The procedure of the operation performed by the rendering unit 121*a* of the ASIC 120*a* of the second embodiment will now be described with reference to the flowchart of FIG. 31. The following description will focus on differences from the first embodiment.

Figure 31:
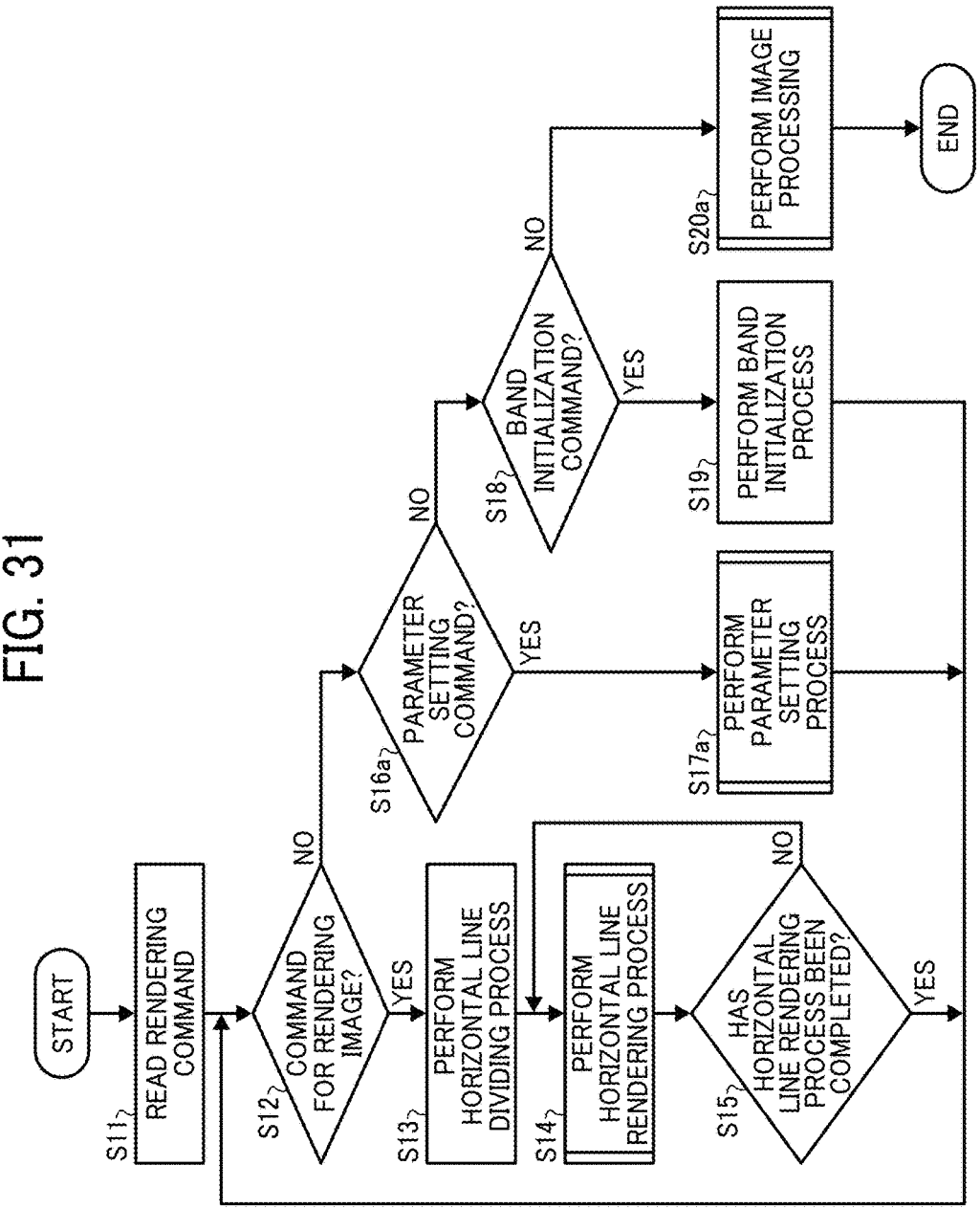
FIG. 31 is a flowchart illustrating an example of a rendering process according to the second embodiment.

As illustrated in FIG. 31, each of the rendering commands is read (step S11). Then, if it is determined that the read rendering command is not the command for rendering an image such as a figure (NO at step S12), the command analyzing device 1211 determines whether the read rendering command is the parameter setting command (step S16*a*). If the read rendering command is the parameter setting command (YES at step S16*a*), the parameter setting process is executed (step S17*a*).

If it is determined at step S16*a* that the read rendering command is not the parameter setting command (NO at step S16*a*), the command analyzing device 1211 determines whether the read rendering command is the band initialization command (step S18). If it is determined at step S18 that the read rendering command is the band initialization command (YES at step S18), the band initialization process is executed (step S19). If it is determined at step S18 that the read rendering command is not the band initialization command (NO at step S18), image processing is executed (step S20*a*).

Figure 32:
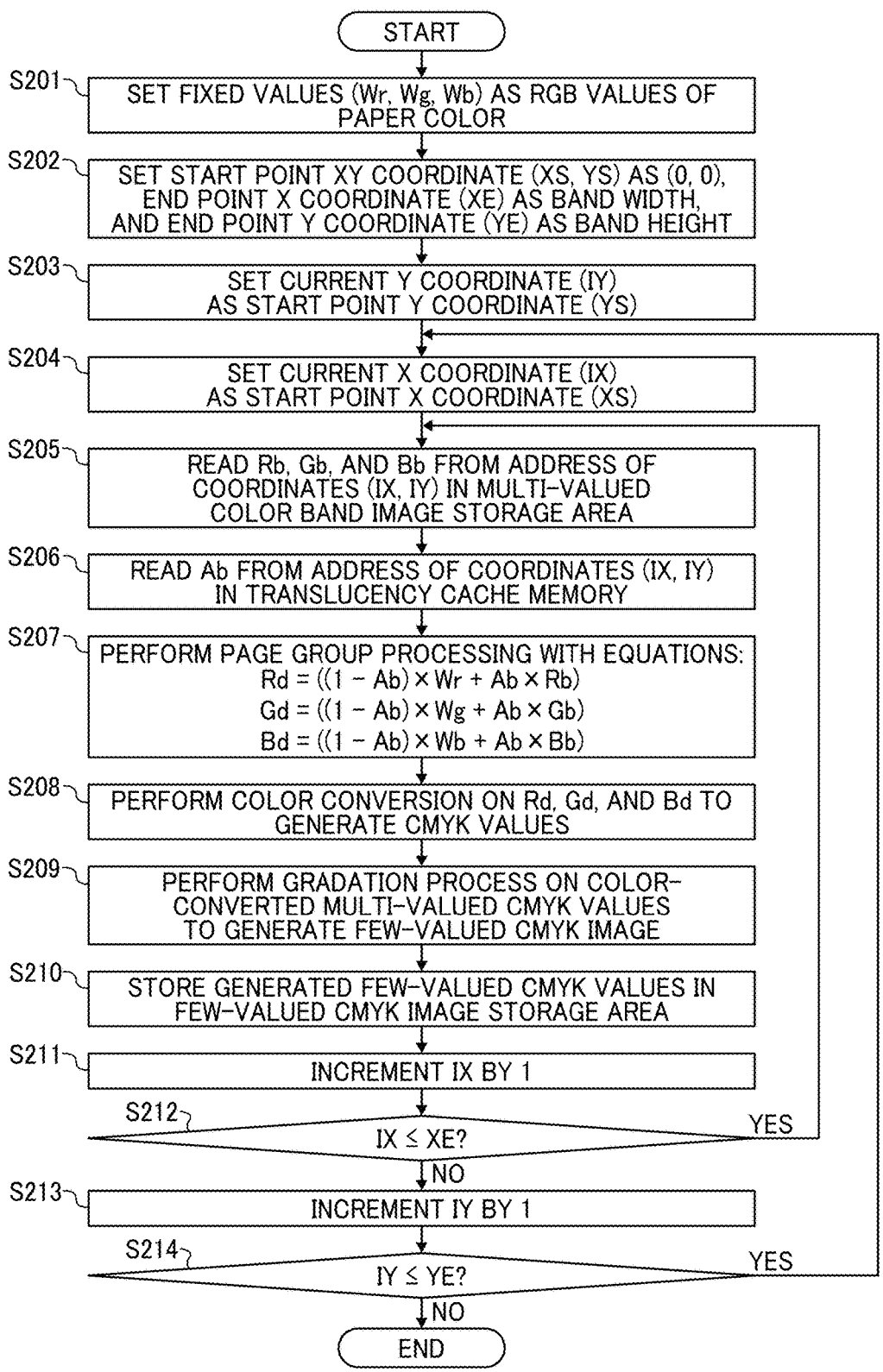
FIG. 32 is a flowchart illustrating an example of image processing according to the second embodiment.

Details of a procedure of the image processing at step S20*a* will be described with reference to the flowchart of FIG. 32.

The fixed values (Wr, Wg, Wb) are first set for the RGB components (step S201). As described above, the fixed values (Wr, Wg, Wb) represent a so-called paper color. In the present example, the R value, the G value, and the B value of the paper color are set as Wr, Wg, and Wb, respectively.

The respective values of the start point X coordinate (XS), the end point X coordinate (XE), the start point Y coordinate (YS), and the end point Y coordinate (YE) of the band image to be processed are then set (step S202). In the present example, the respective values of the start point X coordinate (XS) and the start point Y value (YS) are both zero, and the end point X coordinate (XE) and the end point Y coordinate (YE) correspond to the band width in the X direction and the band height in the Y direction, respectively.

Then, the currently processed Y coordinate (IY) is set (step S203), and the currently processed X coordinate (IX) is set (step S204). In the present example, the currently processed Y coordinate (IY) is set to the start point Y coordinate (YS), and the currently processed X coordinate (IX) is set to the start point X coordinate (XS).

Subsequently, the color values (Rb, Gb, Bb) of the multi-valued color band image indicated by the band coordinates (IX, IY) are read from the multi-valued color band image storage area 152 of the image memory 150 (step S205). Then, the translucency value (Ab) of the translucent band image indicated by the band coordinates (IX, IY) is read from the translucency cache memory 122 (step S206).

The page group processing is then performed (step S207). In the page group processing, the rendering of colors and translucency is performed in page unis and for each of pages, and then the translucency calculation is performed with the rendered colors, the translucency value, and the fixed values to thereby generate colors suitable for rendering on paper. Specifically, a calculation process similar to that described above in the first embodiment is executed. Therefore, the calculation process of the page group processing is executed with parameters similar to those of the foregoing equations (1).

Then, the color conversion process is performed on the color values (Rd, Gd, Bd) in equations (1) to generate CMYK values (step S208), and the gradation process is performed on the thus-generated CMYK values to generate a few-valued CMYK image (step S209). The few-valued CMYK image is then stored in the few-valued CMYK image storage area 153 of the image memory 150 indicated by the band coordinates (IX, IY) (step S210). Then, the value of the X coordinate (IX) is incremented to update the X coordinate (IX) (step S211).

It is then determined whether the calculation process for one horizontal line has been completed (step S212). If the value of the X coordinate (IX) is equal to or less than the value of the end point X coordinate (XE) (YES at step S212), the calculation process for one horizontal line has not been completed. Thus, a loop of steps S205 to S212 is repeated.

If the value of the X coordinate (IX) exceeds the value of the end point X coordinate (XE) (NO at step S212), the calculation process for one horizontal line has been completed. Thus, the Y coordinate (IY) is updated (step S213), and it is determined whether the calculation for the area corresponding to the band height has been completed (step S214). If the value of the Y coordinate (IY) is equal to or less than the value of the end point Y coordinate (YE) (YES at step S214), the calculation process for the area corresponding to the band height has not been completed. Thus, a loop of steps S204 to S214 is repeated. If the value of the Y coordinate (IY) exceeds the value of the end point Y coordinate (YE) (NO at step S214), the calculation process for the area corresponding to band height has been completed. Thus, the image processing is completed.

The color image is expressed with the RGB values in the present example. The image processing of the second embodiment, however, is also applicable to the color image expressed with the CMYK values or the monochromatic image expressed with the K value.

The foregoing first embodiment is configured to perform the page group processing in the rendering process. On the other hand, the controller 100a, which is the image processing device as an example of the information processing device of the second embodiment, is configured such that the ASIC 120a performs the page group processing of images including translucent images after the rendering process.

Figure 33B:
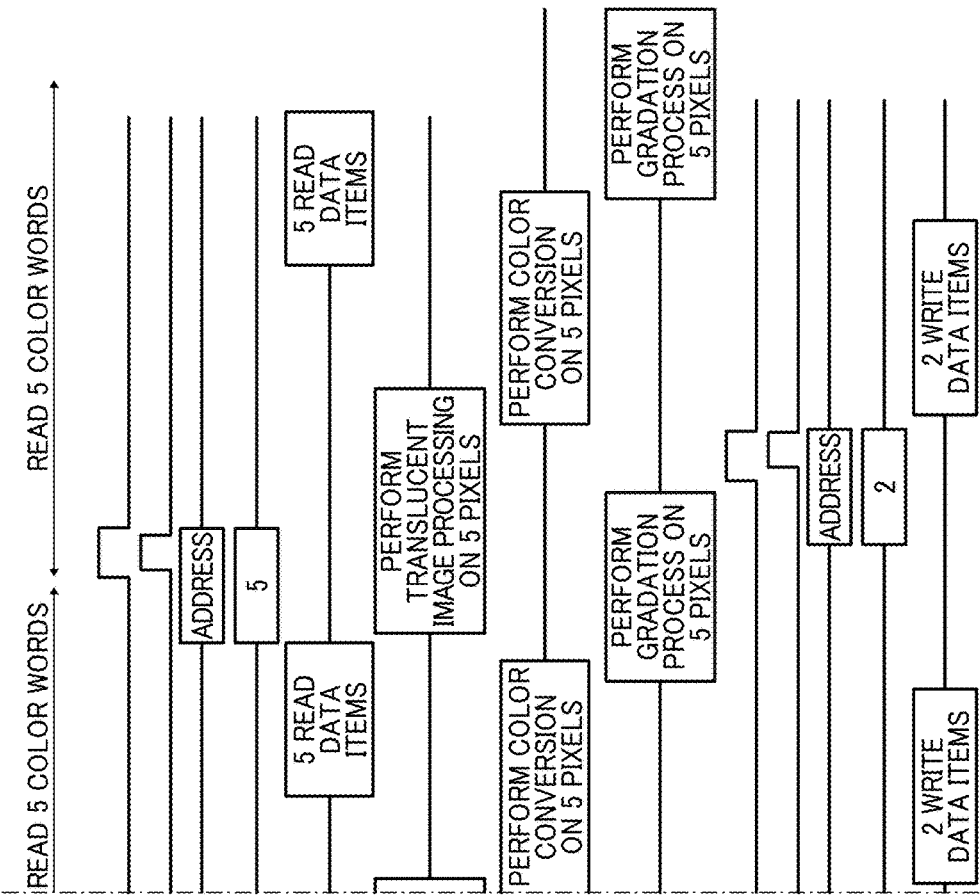

FIGS. 33A and 33B are a timing chart illustrating an example of the page group processing according to the second embodiment. As illustrated in FIG. 33, in the page group processing of the second embodiment, the data reading and writing is limited to in the translucent image processing, and thus there is no need to take the read-modify-write into account. Further, in the color conversion process or the gradation process, the multi-valued band image and the few-valued CMYK image are stored in different storage areas, which also obviates the need to take the read-modify-write into account.

That is, the controller 100a (i.e., the information processing device) of the second embodiment is capable of continuously reading data with no need to wait for the completion of data writing, and also continuously writing data in the image processing at step S6a in FIG. 28. Accordingly, the controller 100a of the second embodiment executes the information processing at higher speed.

An information processing device according to a third embodiment of the present invention will now be described with reference to FIG. 34.

Figure 34:
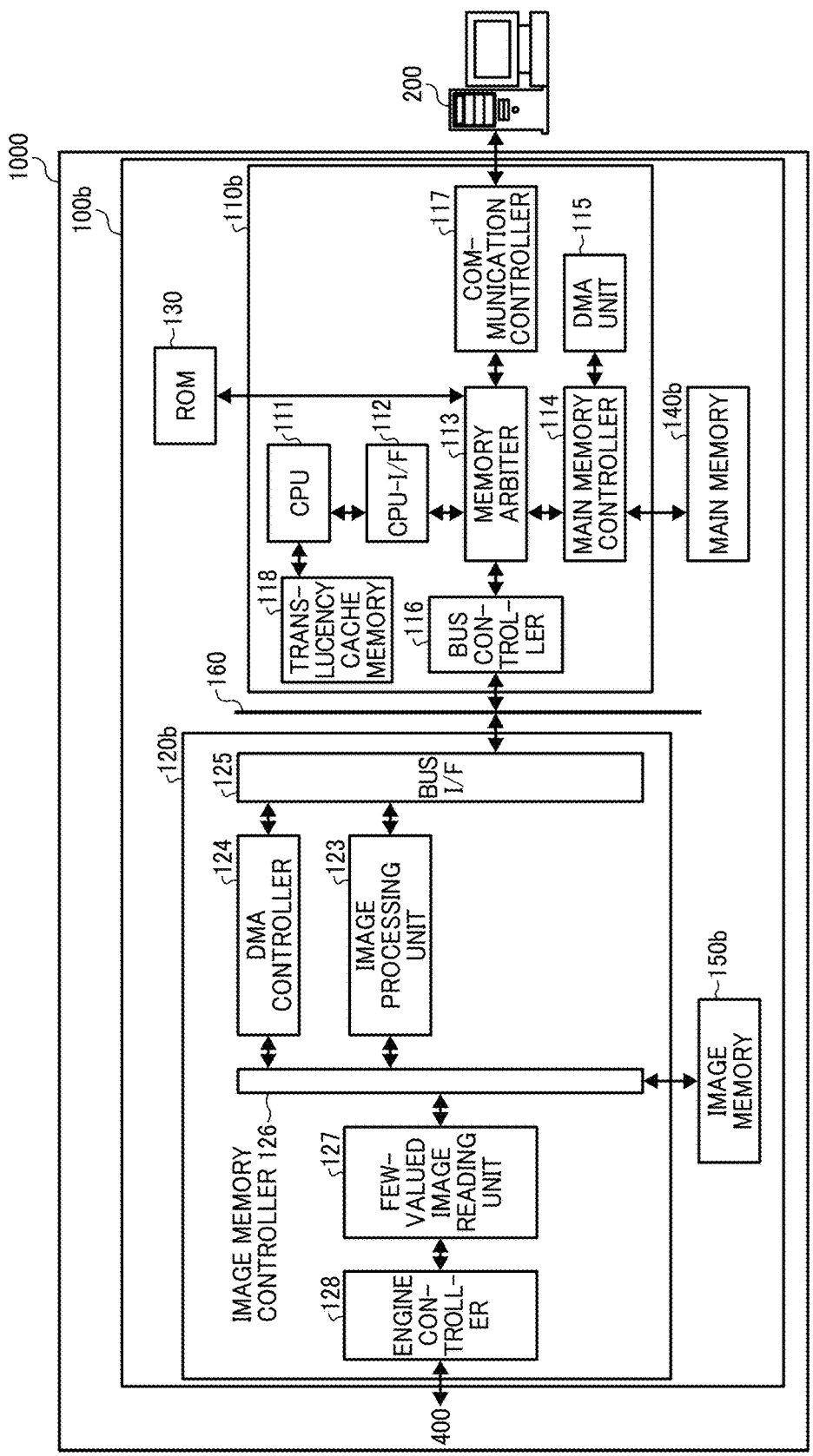
FIG. 34 is a block diagram schematically illustrating a configuration example of an information processing device according to a third embodiment of the present invention.

FIG. 34 is a diagram illustrating a configuration example of a controller 100b as the information processing device of the third embodiment. The controller 100b as the information processing device functions as an image processing device that processes image information. The controller 100b of the third embodiment includes the same components as those of the foregoing controller 100 of the first embodiment. Thus, a detailed description of the already described components will be omitted, and the following description will focus on differences of the controller 100b of the third embodiment from the controller 100 of the first embodiment.

As illustrated in FIG. 34, the controller 100b includes a main controller 110b that controls the operation of the entire controller 100b, an ASIC 120b for image processing, the ROM 130, a main memory 140b, and an image memory 150b. The main controller 110b and the ASIC 120b are connected to each other via the bus 160.

The controller 100b of the third embodiment is different from the controller 100 of the first embodiment in that the rendering unit 121 and the translucency cache memory 122 are not disposed in the ASIC 120b, and that a function corresponding to the translucency cache memory 122 is disposed in the main controller 110b as a translucency cache memory 118 connected to the CPU 111. The translucency cache memory 118 may be implemented by a circuit or a processor, for example.

In accordance with these differences in configuration, the image memory 150b does not include the rendering command storage area 151, and an area for storing the multi-valued color band image is formed in the main memory 140b.

The controller 100b of the third embodiment analyzes the PDL, and the CPU 111 of the controller 100b executes the process of rendering the multi-valued image based on the rendering commands. Thereafter, the image processing unit 123 of the ASIC 120b executes processes related to color conversion and gradation to form the few-valued CMYK image. Therefore, the translucency value for the translucent image processing is generated in the rendering process performed by the CPU 111, and is stored in the translucency cache memory 118. The translucency value stored in the translucency cache memory 118 corresponds to primary, secondary, and tertiary data caches.

With the rendering process executed by the CPU 111, the multi-valued color band image rendered in the main memory 140b is read into the image memory 150b connected to the ASIC 120b via the bus IF 125. The image processing unit 123 reads the multi-valued color band image stored in the image memory 150b to generate the few-valued CMYK image. The other operations and processes of the third embodiment are similar to those of the first or second embodiment described above.

In all of the first to third embodiments of the present invention, the cache memory formed integrally with the integrated circuit forming the ASIC 120 and the semiconductor memory connected to the ASIC 120 via an interface are used as appropriate depending on the type of information processing.

For example, in the ASIC 120 included in the controller 100 of the first embodiment, the translucency cache memory 122 is formed on an integrated circuit (IC) chip. To actually operate the thus-configured ASIC 120, the ASIC 120 is mounted on a circuit board together with other components. In this case, the ASIC 120 is electrically coupled to a circuit pattern by wire bonding.

Terminals of the IC chip of the ASIC 120 are densely disposed. To electrically couple the ASIC 120 to the circuit pattern, therefore, a space for wire bonding is necessary. Thus, the terminals of the IC chip are extended to the outside of a package (i.e., exterior) of the ASIC 120, or lead frames are provided.

The distance of wiring for data exchange between the ASIC 120 of the controller 100 (i.e., the information processing device) and the image memory 150 or the main memory 140b (i.e., the second memory) includes the distance of the lead frames. The translucency cache memory 122 (i.e., the first memory), on the other hand, is a part of the cache memory included in the ASIC 120, and thus does not require such wiring. That is, there is no need to take the lead frames into account in the physical disposition of the translucency cache memory 122.

In sum, as for the disposition of the translucency cache memory 122 (i.e., the first memory) and the image memory 150 (i.e., the second memory) of the controller 100 (i.e., the information processing device), the physical distance between the processing unit that executes information processing and the second memory is longer than the physical distance between the processing unit and the first memory. In other words, the wiring distance between the information processing unit and the first memory is substantially shorter than the wiring distance between the information processing unit and the second memory.

As described above, in all of the controller 100 of the first embodiment, the controller 100a of the second embodiment, and the controller 100b of the third embodiment, the distance between one of the two memories (i.e., the first and second memories) and the information processing unit is substantially different from the distance between the other one of the two memories and the information processing unit. The ASIC 120, for example, has a size of 10 mm$^2$ or less, and thus the lead frames therefor have a length of 5 mm or less, such as a length of approximately 2 mm. Since the cache memory including the first memory is disposed in the IC chip including the information processing unit, the distance between the first memory and the information processing unit is substantially shorter than the distance between the second memory and the information processing unit.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. An information processing device comprising:
a translucency cache memory configured to store a translucency value for rendering a translucent image of one of a band image and a rectangular image;
a double data rate (DDR) image memory configured to store a multi-valued image of the one of the band image and the rectangular image
a memory control circuit connected to the translucency cache memory and the DDR image memory via different respective connections;
a translucent image rendering circuit configured to render the translucent image of the one of the band image and the rectangular image, using the multi-valued image stored in the DDR image memory and the translucency value stored in the translucency cache memory;
a page group processing circuit configured to execute translucency calculation on the one of the band image and the rectangular image based on the multi-valued image stored in the DDR image memory, the translucency value stored in the translucency cache memory, and fixed values corresponding to a recording medium;
a color conversion circuit configured to execute a color conversion process on the one of the band image and the rectangular image subjected to the translucency calculation; and
a halftone processing circuit configured to execute a halftone process on the one of the band image and the rectangular image subjected to the color conversion process,
wherein the memory control circuit is configured to control reading and writing of the translucency value in the translucency cache memory and reading and writing of the multi-valued image in the DDR image memory via the different respective connections, the translucency value has an information amount less than an information amount of the multi-valued image, the translucency value is read and written more frequently than the multi-valued image, and the translucency value takes less time to be read than the multi-valued image.

2. The information processing device of claim 1, wherein the translucency cache memory and the memory control circuit are both included in an integrated circuit, and the DDR image memory is connected to the integrated circuit via an interface.

3. The information processing device of claim 2, wherein the DDR image memory is connected to the integrated circuit via a memory bus.

4. The information processing device of claim 1, wherein the translucent image rendering circuit is configured to execute a rendering process, including
reading the translucency value stored in the translucency cache memory, and reading red-green-blue (RGB) color values of the multi-valued image stored in the DDR image memory,
executing translucency calculation to (i) calculate a translucency value based on the read translucency value and a translucency value to be rendered, and (ii) calculate RGB color values based on the read RGB color values, RGB color values to be rendered, the read translucency value, a translucency value to be rendered, and the calculated translucency value, and
writing the calculated translucency value in the translucency cache memory, and writing the calculated RGB color values in the DDR image memory.

5. The information processing device of claim 4, further comprising a translucency cache memory control circuit configured to prevent simultaneous access to the translucency cache memory, wherein
the page group processing circuit is configured to execute page group processing in which colors and translucency are rendered in page units, including
executing the translucency calculation to generate RGB color values suitable for rendering on the recording medium based on the calculated RGB color values of the multi-valued image stored in the DDR image memory, the calculated translucency value stored in the translucency cache memory, and the fixed values corresponding to the recording medium, which represent a color of the recording medium, and
transmitting the generated RGB color values of the multi-valued image resulting from the page group processing to the color conversion circuit without writing the generated RGB color values in the DDR image memory;
the color conversion circuit is configured to receive the generated RGB color values of the multi-valued image resulting from the page group processing from the page group processing circuit, and execute the color conversion process to convert the generated RGB color values of the multi-valued image resulting from the page group processing into cyan-magenta-yellow-black (CMYK) color values of a multi-valued CMYK image; and
the halftone processing circuit is configured to execute the halftone process to convert the CMYK color values of the multi-valued CMYK image resulting from the color conversion process into CMYK color values of a few-valued CMYK image to be printed on the recording medium.

6. The information processing device of claim 4, wherein the page group processing circuit is configured to execute page group processing in which colors and translucency are rendered in page units, including
executing the translucency calculation to generate RGB color values suitable for rendering on the recording medium based on the calculated RGB color values of the multi-valued image stored in the DDR image memory, the calculated translucency value stored in the translucency cache memory, and the fixed values corresponding to the recording medium, which represent a color of the recording medium, and
writing the generated RGB color values of the multi-valued image resulting from the page group processing in the DDR image memory;
the color conversion circuit is configured to read the generated RGB color values of the multi-valued image resulting from the page group processing from the DDR image memory, and execute the color conversion process to convert the generated RGB color values of the multi-valued image resulting from the page group processing into cyan-magenta-yellow-black (CMYK) color values of a multi-valued CMYK image; and the halftone processing circuit is configured to execute the halftone process to convert the CMYK color values of the multi-valued CMYK image resulting from the color conversion process into CMYK color values of a few-valued CMYK image to be printed on the recording medium.

7. An image processing apparatus comprising the information processing device of claim 1.

8. An information processing device comprising:
at least one memory configured to store computer-readable instructions; and
at least one processor configured to execute the computer-readable instructions to,
store a translucency value for rendering a translucent image of one of a band image and a rectangular image in a translucency cache memory;
store a multi-valued image of the one of the band image and the rectangular image in a double data rate (DDR) image memory;
render the translucent image of the one of the band image and the rectangular image, using the multi-valued image stored in the DDR image memory and the translucency value stored in the translucency cache memory;
perform page group processing including executing translucency calculation on the one of the band image and the rectangular image based on the multi-valued image stored in the DDR image memory, the translucency value stored in the translucency cache memory, and fixed values corresponding to a recording medium;
execute a color conversion process on the one of the band image and the rectangular image subjected to the translucency calculation; and
execute a halftone process on the one of the band image and the rectangular image subjected to the color conversion process,
wherein the at least one processor is further configured to execute the computer-readable instructions to control reading and writing of the translucency value in the translucency cache memory and reading and writing of the multi-valued image in the DDR image memory via different respective connections, the translucency value has an information amount less than an information amount of the multi-valued image, the translucency value is read and written more frequently than the multi-valued image, and the translucency value takes less time to be read than the multi-valued image.

9. The information processing device of claim 8, wherein the translucency cache memory and the at least one processor are both included in an integrated circuit, and the DDR image memory is connected to the integrated circuit via an interface.

10. The information processing device of claim 9, wherein the DDR image memory is connected to the integrated circuit via a memory bus.

11. The information processing device of claim 8, wherein the at least one processor is further configured to execute the computer-readable instructions to execute a rendering process, including
reading the translucency value stored in the translucency cache memory, and reading red-green-blue (RGB) color values of the multi-valued image stored in the DDR image memory,
executing translucency calculation to (i) calculate a translucency value based on the read translucency value and a translucency value to be rendered, and (ii) calculate RGB color values based on the read RGB color values, RGB color values to be rendered, the read translucency value, a translucency value to be rendered, and the calculated translucency value, and
writing the calculated translucency value in the translucency cache memory, and writing the calculated RGB color values in the DDR image memory.

12. The information processing device of claim 11, wherein the at least one processor is further configured to execute the computer-readable instructions to,
prevent simultaneous access to the translucency cache memory;
perform the page group processing in which colors and translucency are rendered in page units, including
executing the translucency calculation to generate RGB color values suitable for rendering on the recording medium based on the calculated RGB color values of the multi-valued image stored in the DDR image memory, the calculated translucency value stored in the translucency cache memory, and the fixed values corresponding to the recording medium, which represent a color of the recording medium, and
transmitting the generated RGB color values of the multi-valued image resulting from the page group processing without writing the generated RGB color values in the DDR image memory;
receive the generated RGB color values of the multi-valued image resulting from the page group processing, and execute the color conversion process to convert the generated RGB color values of the multi-valued image resulting from the page group processing into cyan-magenta-yellow-black (CMYK) color values of a multi-valued CMYK image; and
execute the halftone process to convert the CMYK color values of the multi-valued CMYK image resulting from the color conversion process into CMYK color values of a few-valued CMYK image to be printed on the recording medium.

13. The information processing device of claim 11, wherein the at least one processor is further configured to execute the computer-readable instructions to:
perform the page group processing in which colors and translucency are rendered in page units, including
executing the translucency calculation to generate RGB color values suitable for rendering on the recording medium based on the calculated RGB color values of the multi-valued image stored in the DDR image memory, the calculated translucency value stored in the translucency cache memory, and the fixed values corresponding to the recording medium, which represent a color of the recording medium, and
writing the generated RGB color values of the multi-valued image resulting from the page group processing in the DDR image memory;
read the generated RGB color values of the multi-valued image resulting from the page group processing from the DDR image memory, and execute the color conversion process to convert the generated RGB color values of the multi-valued image resulting from the page group processing into cyan-magenta-yellow-black (CMYK) color values of a multi-valued CMYK image; and
execute the halftone process to convert the CMYK color values of the multi-valued image resulting from the color conversion process into CMYK color values of a few-valued CMYK image to be printed on the recording medium.

14. An image forming apparatus comprising the information processing device of claim 8.

15. An information processing method comprising:
storing a translucency value for rendering a translucent image of one of a band image and a rectangular image in a translucency cache memory;
storing a multi-valued image of the one of the band image and the rectangular image in a double data rate (DDR) image memory;
rendering the translucent image of the one of the band image and the rectangular image, using the multi-valued image stored in the DDR image memory and the translucency value stored in the translucency cache memory;
performing page group processing including executing translucency calculation on the one of the band image and the rectangular image based on the multi-valued image stored in the DDR image memory, the translucency value stored in the translucency cache memory, and fixed values corresponding to a recording medium;
executing a color conversion process on the one of the band image and the rectangular image subjected to the translucency calculation; and
executing a halftone process on the one of the band image and the rectangular image subjected to the color conversion process, wherein the information processing method further includes controlling reading and writing of the translucency value in the translucency cache memory and reading and writing of the multi-valued image in the DDR image memory via different respective connections, the translucency value has an information amount less than an information amount of the multi-valued image, the translucency value is read and written more frequently than the multi-valued image, and the translucency value takes less time to be read than the multi-valued image.

* * * * *